United States Patent
Sugimoto

(10) Patent No.: US 7,848,632 B2
(45) Date of Patent: Dec. 7, 2010

(54) IMAGE SENSING APPARATUS AND METHOD OF CONTROLLING SAME

(75) Inventor: Masahiko Sugimoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 945 days.

(21) Appl. No.: 11/709,151

(22) Filed: Feb. 22, 2007

(65) Prior Publication Data

US 2007/0196097 A1 Aug. 23, 2007

(30) Foreign Application Priority Data

Feb. 23, 2006 (JP) .............................. 2006-046112

(51) Int. Cl.
*G03B 7/08* (2006.01)
(52) U.S. Cl. .................... 396/234; 348/222.1
(58) Field of Classification Search ................. 396/234, 396/219; 348/208.12, 229.1, 222.1
See application file for complete search history.

(56) References Cited

U.S. PATENT DOCUMENTS

| 7,593,633 | B2 * | 9/2009 | Okamoto | 396/222 |
| 7,636,123 | B2 * | 12/2009 | Fukui | 348/370 |
| 7,683,964 | B2 * | 3/2010 | Okuno | 348/364 |
| 2005/0219393 | A1 * | 10/2005 | Sugimoto | 348/333.01 |
| 2006/0077264 | A1 * | 4/2006 | Ikeda | 348/222.1 |

FOREIGN PATENT DOCUMENTS

| JP | 5-66458 A | 3/1993 |
| JP | 2003-107555 A | 4/2003 |
| JP | 2003-107567 A | 4/2003 |
| JP | 2004-207795 A | 7/2004 |
| JP | 2005-117532 A | 4/2005 |
| JP | 2005-160122 A | 6/2005 |
| JP | 2005-210209 A | 8/2005 |
| JP | 2006-333205 A | 12/2006 |

* cited by examiner

*Primary Examiner*—Christopher Mahoney
(74) *Attorney, Agent, or Firm*—Birch, Stewart, Kolasch & Birch, LLP.

(57) ABSTRACT

It is so arranged that the portion of the image of a subject that is a face takes on an appropriate brightness. The image of the subject is obtained by imaging the subject. The subject image is subjected to face detection processing and an area construed as being the face-image portion is found. An area corresponding to this area is set in an image obtained by standardizing the subject image. An AE area used in control of exposure is specified from the area that has been set. Brightness is calculated based upon image data representing the image within the specified AE area, and exposure is controlled. Even if an image such as a tree is in the background of the face image, the brightness of the face-image portion is calculated comparatively accurately and a subject image having the appropriate brightness is obtained.

33 Claims, 25 Drawing Sheets

*Fig. 3*

INFORMATION CONCERNING
RESULT OF FACE DETECTION

| RESULT OF FACE DETECTION | REMARKS |
|---|---|
| NUMBER OF FACES DETECTED | UP TO PREDETERMINED UPPER-LIMIT VALUE |
| POSITION OF EACH FACE | CENTER COORDINATES OF EACH FACE (COORDINATE SYSTEM OF STANDARDIZED IMAGE SIZE) |
| SIZE OF EACH FACE | HALF OF ONE SIDE OR RECTANGLE: DISTANCE BETWEEN CENTER AND SIDE (COORDINATE SYSTEM OF STANDARDIZED IMAGE SIZE) |
| DETECTION SCORE OF EACH FACE | INDICATOR OF DEGREE TO WHICH PORTION OF IMAGE IS FACE-LIKE |
| ORIENTATION OF EACH FACE | ORIENTED FRONT, ORIENTED RIGHT, ORIENTED LEFT, ORIENTED UP, ORIENTED DOWN, ETC. |
| INCLINATION OF EACH FACE | DISCRIMINATE UPRIGHT TO INCLINED ANGLES OF ROTATION; 30° UNITS |

LEFT-ORIENTED
FACE IMAGE

FRONT-ORIENTED
FACE IMAGE

RIGHT-ORIENTED
FACE IMAGE

| Fig. 5A | Fig. 5B | Fig. 5C | Fig. 5D |
|---|---|---|---|
| FACE-IMAGE PORTION HAVING INCLINATION OF 0° | FACE-IMAGE PORTION HAVING INCLINATION OF 30° | FACE-IMAGE PORTION HAVING INCLINATION OF 60° | FACE-IMAGE PORTION HAVING INCLINATION OF 90° |
|  |  |  | 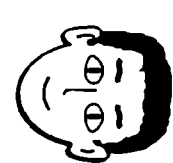 |

Fig. 6

| | INCLINATION = 0,90,180,270 | | INCLINATION = OTHER THAN 0,90,180,270 | |
|---|---|---|---|---|
| | AF TARGET AREA | COORDINATE POSITION | AF TARGET AREA | COORDINATE POSITION |
| ORIENTATION = 0 | 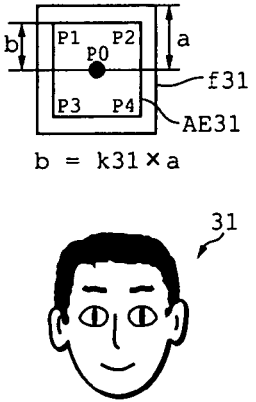<br>b = k31×a | P1x=P0x-b<br>P1y=P0y-b<br>P2x=P0x+b<br>P2y=P0y-b<br>P3x=P0x-b<br>P3y=P0y+b<br>P4x=P0x+b<br>P4y=P0y+b | 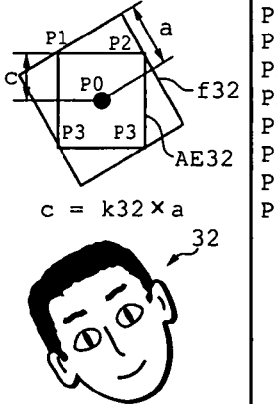<br>c = k32×a | P1x=P0x-c<br>P1y=P0y-c<br>P2x=P0x+c<br>P2y=P0y-c<br>P3x=P0x-c<br>P3y=P0y+c<br>P4x=P0x+c<br>P4y=P0y+c |
| ORIENTATION > 0 (ORIENTATION = 90) | 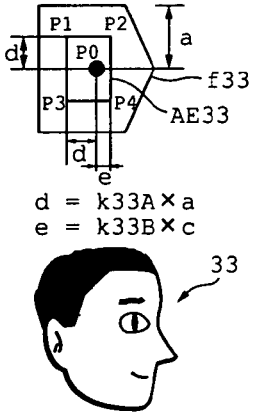<br>d = k33A×a<br>e = k33B×c | P1x=P0x-d<br>P1y=P0y-d<br>P2x=P0x+e<br>P2y=P0y-d<br>P3x=P0x-d<br>P3y=P0y+d<br>P4x=P0x+e<br>P4y=P0y+d | 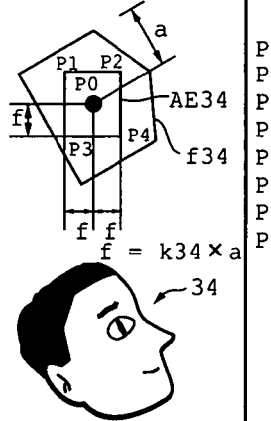<br>f = k34×a | P1x=P0x-f<br>P1y=P0y-f<br>P2x=P0x+f<br>P2y=P0y-f<br>P3x=P0x-f<br>P3y=P0y+f<br>P4x=P0x+f<br>P4y=P0y+f |
| ORIENTATION > 0 (ORIENTATION = -90) | 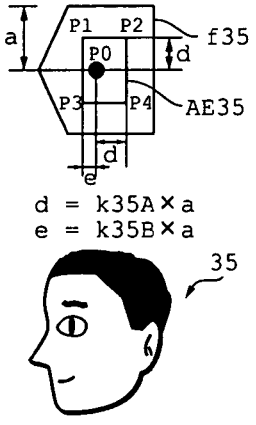<br>d = k35A×a<br>e = k35B×a | P1x=P0x-e<br>P1y=P0y-d<br>P2x=P0x+d<br>P2y=P0y-d<br>P3x=P0x-e<br>P3y=P0y+d<br>P4x=P0x+d<br>P4y=P0y+d | 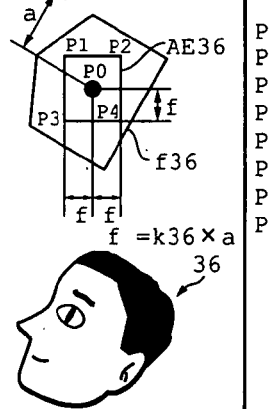<br>f = k36×a | P1x=P0x-f<br>P1y=P0y-f<br>P2x=P0x+f<br>P2y=P0y-f<br>P3x=P0x-f<br>P3y=P0y+f<br>P4x=P0x+f<br>P4y=P0y+f |

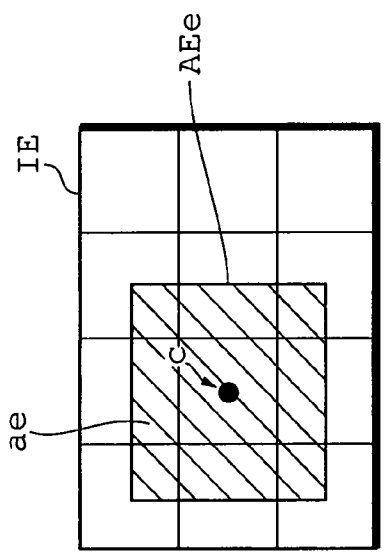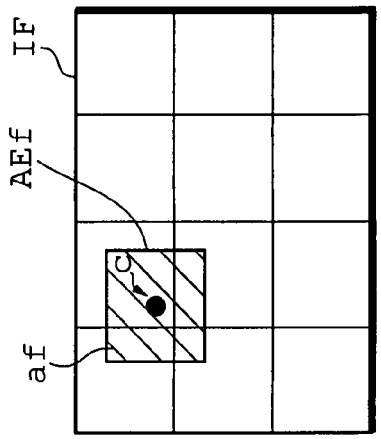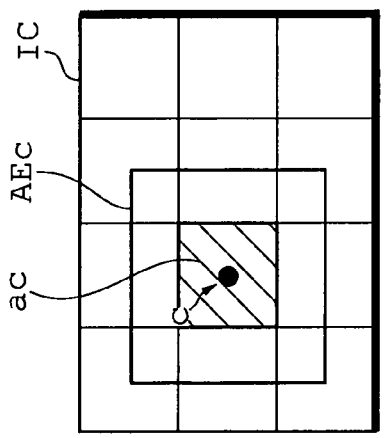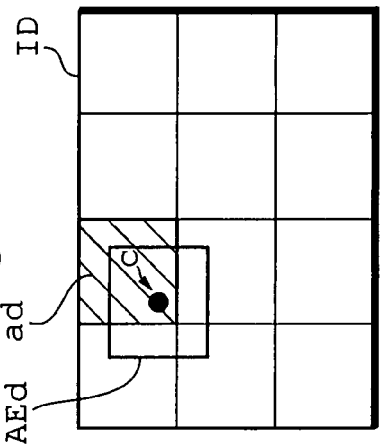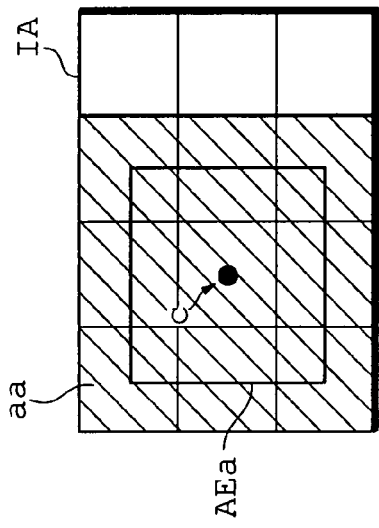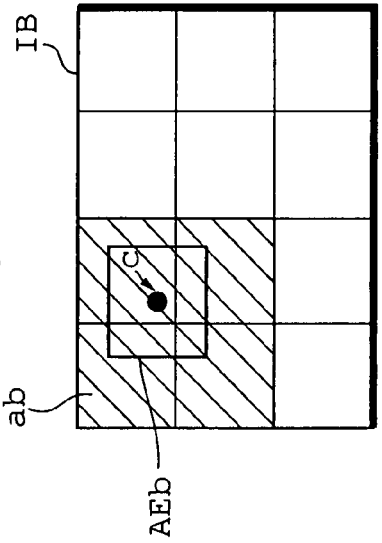

IMAGE SENSING APPARATUS AND METHOD OF CONTROLLING SAME

BACKGROUND OF THE INVENTION

1. Field of the Invention

This invention relates to an image sensing apparatus and to a method of controlling this apparatus.

2. Description of the Related Art

Pertinent examples of the prior art include one in which metering is performed using a metering sensor having a number of metering elements in order to calculate amount of exposure (see the specification of Japanese Patent Application Laid-Open No. 5-66458), one in which the portion of a person that is the person's face is detected from within the image of a subject and exposure is carried out in such a manner that the face-image portion will take on the appropriate brightness (see the specification of Japanese Patent Application Laid-Open No. 2003-107555), and one in which the position of a person, etc., is detected from within the image of a subject and AE (Automatic Exposure) is performed in conformity with the person, etc. (see the specification of Japanese Patent Application Laid-Open No. 2005-160122).

However, since control is performed in such a manner that the very portion detected as the portion in which a face or person exists will take on the appropriate brightness, accurate AE control cannot be carried out in a case where the detected portion does not define a face or person accurately, as in a case where the detected portion contains background or the like. Further, there are instances where the overall image of the subject will take on a much more attractive appearance if AE control of a specific target-image portion is carried out taking the background into consideration.

SUMMARY OF THE INVENTION

Accordingly, an object of the present invention is to so arrange it that a target-image portion will take on a more appropriate brightness.

Another object of the present invention is to so arrange it that the overall image of a subject will take on an attractive appearance.

According to a first aspect of the present invention, the foregoing objects are attained by providing an image sensing apparatus comprising: a solid-state electronic image sensing device for sensing the image of a subject and outputting image data representing the image of the subject; an exposure control device for adjusting amount of exposure of the solid-state electronic image sensing device; a target image detecting device for detecting a prescribed target-image portion from within the image of the subject represented by the image data that is output from the solid-state electronic image sensing device; an AE target area deciding device for deciding an AE target area, which is for obtaining the brightness of the target-image portion, based upon the target-image portion detected by the target image detecting device; an exposure-amount deciding device for deciding amount of exposure of the solid-state electronic image sensing device based upon image data representing an image within the AE target area decided by the AE target area deciding device; and a control device for controlling the exposure control device so as to obtain the amount of exposure decided by the exposure-amount deciding device.

The first aspect of the present invention also provides a control method suited to the above-described image sensing apparatus. Specifically, the present invention provides a method of controlling an image sensing apparatus having a solid-state electronic image sensing device for sensing the image of a subject and outputting image data representing the image of the subject, and an exposure control device for adjusting amount of exposure of the solid-state electronic image sensing device, the method comprising the steps of: detecting a prescribed target-image portion from within the image of the subject represented by the image data that is output from the solid-state electronic image sensing device; deciding an AE target area, which is for obtaining the brightness of the target-image portion, based upon the target-image portion detected; deciding amount of exposure of the solid-state electronic image sensing device based upon image data representing an image within the AE target area decided; and controlling the exposure control device so as to obtain the amount of exposure decided.

In accordance with the first aspect of the present invention, a prescribed target-image portion (a portion of the image of the subject that is a face, person or eye, etc.) is detected from within the image of the subject, which is represented by image data that is output from the solid-state electronic image sensing device. On the basis of the target-image portion detected, an AE target area for obtaining the brightness of the target-image portion is decided. The amount of exposure of the solid-state electronic image sensing device is decided based upon image data representing the image within the AE target area decided. The detected target-image portion is not decided but rather the AE target area, which is decided based upon the target-image portion, and control is exercised in such a manner that the image within the AE target area will take on the appropriate brightness. Even if the detected target-image portion contains background or the like and does not accurately specify a target-image portion, the actual target-image portion can be made to have the appropriate brightness. Further, even if the detected target-image portion is so small that exposure control cannot be carried out, exposure control can be achieved by making the AE target area broader than the detected target-image portion.

By way of example, the AE target area deciding device decides the AE target area in such a manner that the AE target area falls within the target-image portion.

Further, the AE target area deciding device may decide the AE target area based upon at least one of inclination and orientation of the target-image portion.

The AE target area decided by the AE target area deciding device can take on a scope that may be predetermined based upon the target-image portion.

If the image of the subject contains a plurality of target-image portions, then the AE target area can be decided based upon a target-image portion that has a high priority.

The priority may depend upon at least one among size of the target image portion, degree to which an image portion has the qualities of a target-image portion, and position, brightness, inclination and orientation of the target-image portion.

In a case where the brightnesses of the plurality of target-image portions are equal to or greater than a representative value indicating the brightness of the image of the subject, priority rises in order of increasing darkness of the target-image portions. In a case where the brightnesses of the plurality of target-image portions are less than the representative value indicating the brightness of the image of the subject, priority rises in order of increasing brightness of the target-image portions.

If the image of the subject contains a plurality of target-image portions, the amount of exposure can be decided based upon a weighted mean of the brightnesses of the plurality of target-image portions.

The weighted mean can be calculated upon deciding weighting coefficients using at least one among size of the target image portion, degree to which an image portion has the qualities of a target-image portion, and position, brightness, inclination and orientation of the target-image portion.

The apparatus may further comprise a flash light-emission device for emitting a flash of light if the amount of exposure obtained based upon the amount of exposure decided by the exposure-amount deciding device is less than a predetermined value.

The apparatus may further comprise an area converting device for converting the AE target area, which has been decided by the AE target area deciding device, to an area on an AE image having a size different from size of the image of the subject and corresponding to the image of the subject. In this case, the exposure-amount deciding device decides the amount of exposure of the solid-state electronic image sensing device based upon image data representing an image within the area obtained by the conversion performed by the area converting device.

According to a second aspect of the present invention, the foregoing objects are attained by providing an image sensing apparatus comprising: a solid-state electronic image sensing device for sensing the image of a subject and outputting image data representing the image of the subject; an exposure-amount calculating device for calculating amount of exposure based upon the image of the subject and a prescribed target-image portion contained in the image of the subject represented by the image data that has been output from the solid-state electronic image sensing device; and an exposure control device for adjusting amount of exposure of the solid-state electronic image sensing device so as to obtain the amount of exposure calculated by the exposure-amount calculating device.

The second aspect of the present invention also provides a control method suited to the above-described image sensing apparatus. Specifically, the present invention provides a method of controlling an image sensing apparatus, the method comprising the steps of: sensing the image of a subject using a solid-state electronic image sensing device and obtaining image data representing the image of the subject; calculating amount of exposure based upon the image of the subject and a prescribed target-image portion contained in the image of the subject represented by the image data that has been output from the solid-state electronic image sensing device; and adjusting amount of exposure of the solid-state electronic image sensing device so as to obtain the amount of exposure calculated.

In accordance with the second aspect of the present invention, amount of exposure is calculated based upon the image of the subject obtained by imaging and a prescribed target-image portion contained in the image of the subject. The amount of exposure of the solid-state electronic image sensing device is adjusted so as to obtain the amount of exposure calculated. The amount of exposure is not decided based solely upon the target-image portion or solely upon the overall image of the subject. Rather, the amount of exposure is decided taking into consideration the target-image portion and the overall image of the subject. As a result, the image of the subject obtained has an attractive, bright appearance for both the target-image portion and the overall image of the subject.

By way of example, the exposure-amount calculating device calculates the amount of exposure based upon the image of the subject and at least one among position, size, number and brightness of the target-image portion and degree to which an image portion has the qualities of a target-image portion.

The exposure-amount calculating device may calculate the amount of exposure based upon the target-image portion and at least one among a brightness representative value representing a feature of the overall image of the subject, a zone photometric value obtained by zone metering of the overall image of the subject, a histogram of the overall image of the subject, a maximum value, or a value in the vicinity thereof, of a zone photometric value of the image of the subject, and a minimum value, or a value in the vicinity thereof, of a zone photometric value of the image of the subject.

If the image of the subject has been divided into a plurality of areas, the exposure-amount calculating device may calculate the amount of exposure based upon the image of the subject and images in all divided areas that include the target-image portion or an image in a divided area contained in the target-image portion.

The exposure-amount calculating device may calculate the amount of exposure in such a manner that the difference between brightness of the target image and brightness of the image of the subject will fall within a prescribed range.

The prescribed range may be a fixed range, a range designated by the user or a range that varies depending upon the scene.

In an indicator that indicates a ratio with respect to a brightness distribution of the overall image of the subject, the exposure-amount calculating device may calculate an amount of exposure in such a manner that the difference between a value corresponding to a representative value of brightness of the image of the subject and a value corresponding to brightness obtained from the amount of exposure calculated based upon the target-image portion and image of the subject will fall within a prescribed range. Here the indicator that indicates the ratio with respect to the brightness distribution of the overall image of the subject indicates cumulative frequency or a value obtained by dividing cumulative frequency by a total number.

Furthermore, if the image of the subject contains a plurality of target-image portions, the exposure-amount calculating device may calculate the amount of exposure based upon a target-image portion that has a high priority.

The priority may depend upon at least one among size of the target image portion, degree to which an image portion has the qualities of a target-image portion, and position, brightness, inclination and orientation of the target-image portion.

Preferably, in a case where the brightnesses of the plurality of target-image portions are equal to or greater than a representative value indicating the brightness of the image of the subject, priority rises in order of increasing darkness of the target-image portions. In a case where the brightnesses of the plurality of target-image portions are less than the representative value indicating the brightness of the image of the subject, priority rises in order of increasing brightness of the target-image portions.

If the image of the subject contains a plurality of target-image portions, the exposure-amount calculating device may calculate the amount of exposure based upon a weighted mean of the brightnesses of the plurality of target-image portions.

The weighted mean can be calculated upon deciding a weighting coefficient using at least one among size of the target image portion, degree to which an image portion has the qualities of a target-image portion, and position, brightness, inclination and orientation of the target-image portion.

The apparatus may further comprise a flash light-emission device for emitting a flash of light if the amount of exposure that has been adjusted by the exposure control device is less than a predetermined value.

The apparatus may further comprise a flash light-emission device for emitting a flash of light if the difference between brightness of the target-image portion and brightness of the image of the subject is outside a first prescribed range.

The apparatus may further comprise a flash light-emission device for emitting a flash of light if the difference between brightness of the target-image portion and brightness indicated by the amount of exposure that has been calculated by the exposure-amount calculating device is outside a second prescribed range.

The apparatus may further comprise a distance calculating device for calculating distance to a subject. In this case, the flash light-emission device may be adapted to emit a flash of light if flash arrival distance is equal to or greater than the distance calculated by the distance calculating device.

In a case where an imaging lens for forming the image of a subject is provided in front of the solid-state electronic image sensing device, the distance calculating device can calculate the distance from information concerning the target-image portion and information concerning focal length of the imaging lens.

The distance calculating device may calculate the distance to the subject based upon information obtained from a distance sensor.

According to a third aspect of the present invention, the foregoing objects are attained by providing an image sensing apparatus comprising: a solid-state electronic image sensing device for sensing the image of a subject and outputting image data representing the image of the subject; a weighting-coefficient deciding device for deciding a weighting coefficient in each portion of the image of the subject in such a manner that the closer a portion is to a target-image portion contained in the image of the subject represented by the image data that is output from the solid-state electronic image sensing device, the larger weighting becomes; a calculating device for calculating brightness of the target-image portion using the weighting coefficient decided by the weighting-coefficient deciding device and brightness of each portion of the image of the subject; and an exposure-amount control device for controlling amount of exposure of the solid-state electronic image sensing device based upon the brightness calculated by the calculating device.

The third aspect of the present invention also provides a control method suited to the above-described image sensing apparatus. Specifically, the present invention provides a method of controlling an image sensing apparatus, the method comprising the steps of: sensing the image of a subject using a solid-state electronic image sensing device and obtaining image data representing the image of the subject; deciding a weighting coefficient in each portion of the image of the subject in such a manner that the closer a portion is to a target-image portion contained in the image of the subject represented by the image data that is output from the solid-state electronic image sensing device, the larger weighting becomes; calculating brightness of the target-image portion using the weighting coefficient decided and brightness of each portion of the image of the subject; and controlling amount of exposure of the solid-state electronic image sensing device based upon the brightness calculated.

In accordance with the third aspect of the present invention, a weighting coefficient in each portion of the image of a subject is decided in such a manner that the closer a portion of the image of the subject is to a target-image portion contained in the image of the subject, the larger weighting becomes. The brightness of the target-image portion is calculated using the weighting coefficients decided and the brightness of each portion of the image of the subject, and the amount of exposure of the solid-state electronic image sensing device is controlled based upon the brightness calculated. The closer a portion is to the target-image portion, the more important the portion is considered to be. The amount of exposure can be controlled in such a manner that the important portion will take on a comparatively appropriate brightness.

By way of example, the exposure-amount control device calculates the amount of exposure based upon the target-image portion and, in a case where the image of the subject has been divided into a plurality of areas, photometric values of respective ones of the areas obtained by division or representative values of brightness of the image of the subject obtained based upon the photometric values.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 illustrates an example of information indicating results of face detection;

FIG. 5A illustrates a face-image portion having an inclination of 0°, FIG. 5B a face-image portion having an inclination of 30°, FIG. 5C a face-image portion having an inclination of 60° and FIG. 5D a face-image portion having an inclination of 90°;

FIG. 6 illustrates the relationship between areas detected as face images and AE areas utilized in exposure control;

FIGS. 13A to 13F illustrate examples of images of a subject;

DESCRIPTION OF THE PREFERRED EMBODIMENTS

Preferred embodiments of the present invention will now be described in detail with reference to the drawings.

Figure 1:
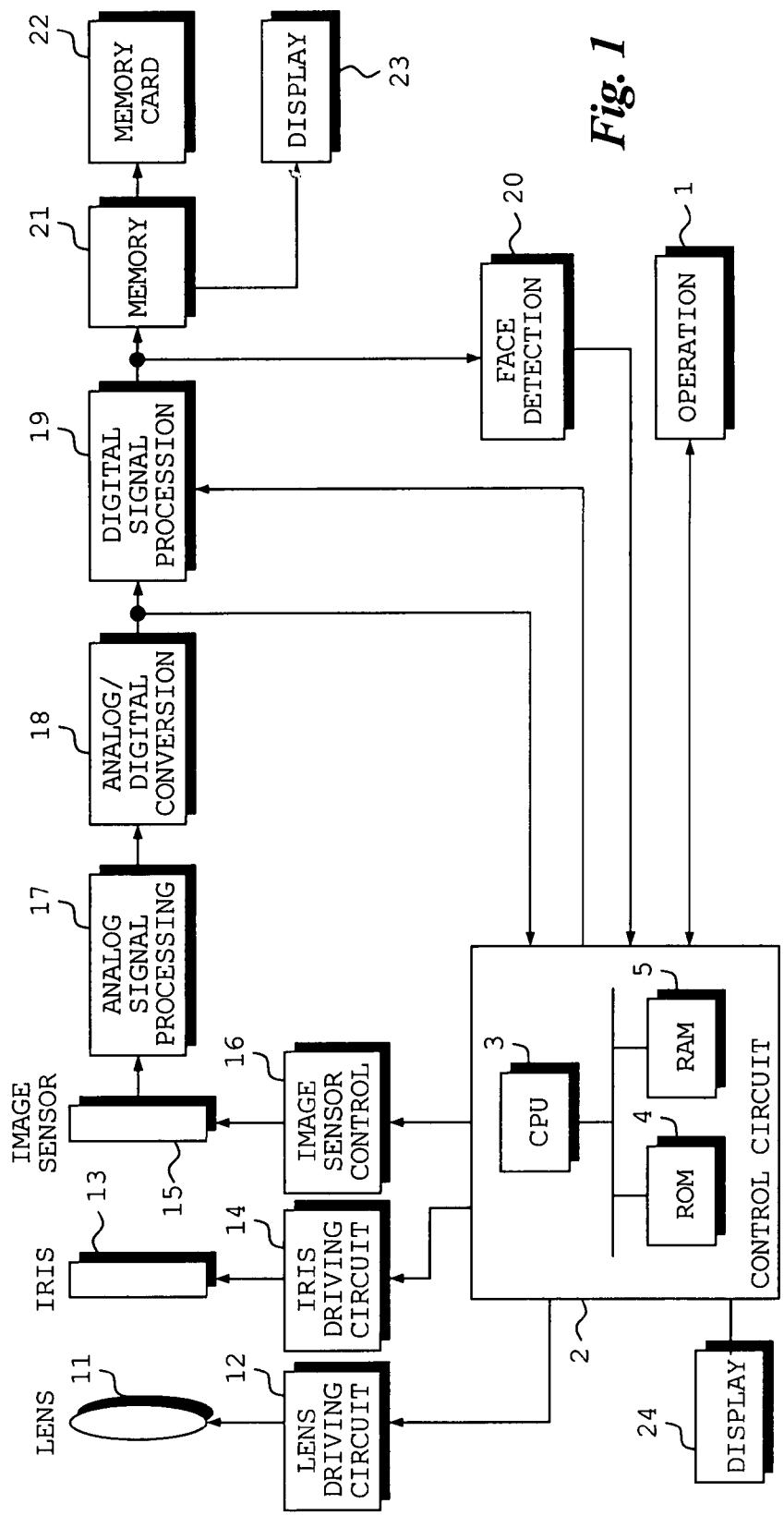
FIG. 1 is a block diagram illustrating the electrical structure of a digital still camera.

FIG. 1, which illustrates an embodiment of the invention, is a block diagram illustrating the electrical structure of a digital still camera.

The overall operation of the digital still camera is controlled by a control circuit 2. The latter includes a CPU 3, a ROM 4 and a RAM 5, which are interconnected by a bus. The digital still camera includes operating buttons 1 such as a shutter-release button of two-step stroke type, a power button, a mode setting dial, a menu button, a decide button and a so-called cross-hair button formed in such a manner that up, down, left and right arrows can be pressed. Output signals from the operating buttons 1 are applied to the control circuit 2. Also connected to the control circuit 2 is a unit 24 for emitting an electronic flash when the amount of exposure falls below a fixed amount.

If an image sensing mode is set, light flux representing the image of the subject is converged by an imaging lens 11 positioned by a lens driving circuit 12. A light beam representing the image of the subject impinges upon the photoreceptor surface of an image sensor 15 such as a CCD via an iris 13 whose f-stop value is controlled by an iris driving circuit 14. By controlling the image sensor 15 using a control circuit 16 for controlling the image sensor, an analog video signal representing the image of the subject is output from the image sensor.

An analog signal processing circuit 17 subjects the video signal to prescribed analog processing such as correlated double sampling and a white balance correction. The video signal that is output from the analog signal processing circuit 17 is converted to digital image data by an analog/digital converting circuit 18. The digital image data obtained by the conversion is input to the control circuit 2 and to a digital signal processing circuit 19. The latter executes prescribed digital signal processing such as a gamma correction.

Image data that has been output from the digital signal processing circuit 19 is applied also to a display unit 23 via a memory 21.

In the digital still camera according to this embodiment, the image of a face can be detected from within the image of a subject. The digital still camera is provided with a face detecting circuit 20 for this purpose, and the image data that has been output from the digital signal processing circuit 19 is input to the face detecting circuit 20. The result of detection in the face detecting circuit 20 is, e.g., the position of the face-image portion. Data indicating the result of detection is input to the control circuit 2.

Image data representing the overall image of the subject and data indicating the result of face detection is input to the control circuit 2, as mentioned above. Based upon the data indicating the result of face detection, data representing the face-image portion is extracted from the image data representing the overall image of the subject.

If the shutter-release button is pressed through the first step of its stroke, the image sensor 15 and iris 13 are controlled by the control circuit 2, using the data representing the extracted face-image portion and the data representing the overall image of the subject, in such a manner that the amount of exposure of the image sensor 15 will be appropriate (in such a manner that the image of the subject will take on an appropriate brightness). The details of this exposure control will be described later.

If the shutter-release button is pressed through the second step of its stroke, the image data that has been output from the digital signal processing circuit 19 is applied to and stored temporarily in the memory 21, as described above. The image data is read out of the memory 21 and applied to a memory card 22, whereby the image data is recorded on the memory card 22.

Figure 2A:
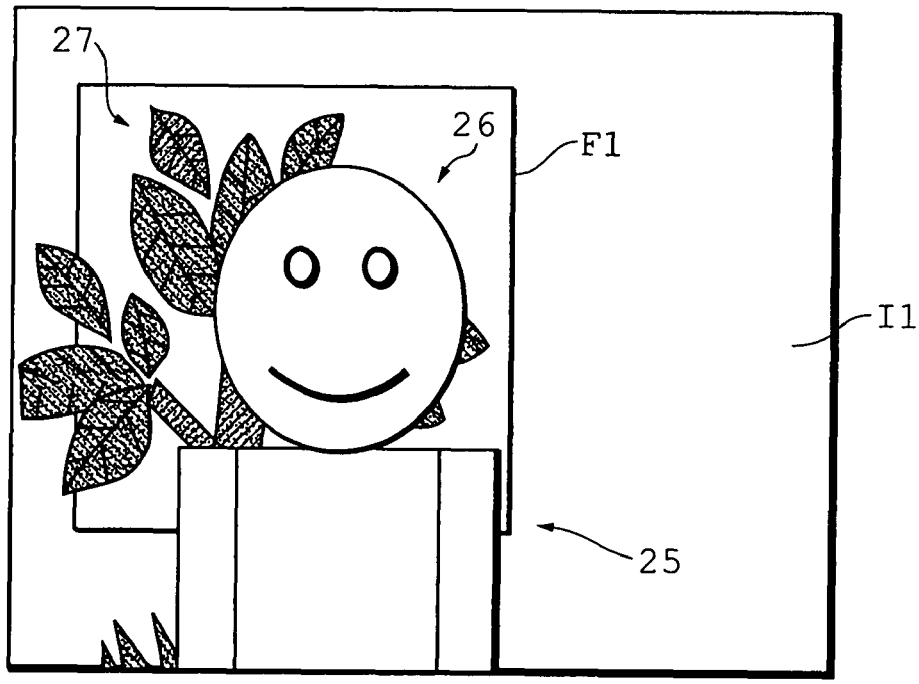
FIG. 2A illustrates an example of the image of a subject.
Figure 2B:
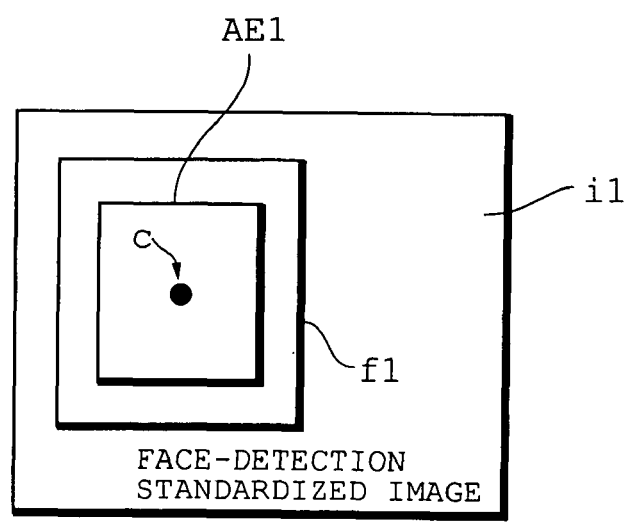
FIG. 2B illustrates an example of a face-detection standardized image.

FIG. 2A illustrates an example of the image of a subject, and FIG. 2B illustrates an example of a face-detection standardized image.

As shown in FIG. 2A, a subject image I1 contains an image 25 of a person and an image 27 of a tree. By applying face detection processing to the subject image I1, a portion defined in an area is detected as a face-image portion from within the subject image I1. Incorporated in the area F1 is not only an image portion 26 corresponding to the actual face but also an image 27 of a tree located behind the person constituting the subject. The area F1, therefore, does not strictly specify only the face-image portion 26. If exposure control is carried out in such a manner that the image in area F1 will have the appropriate brightness, the result of such control may be inaccurate. In this embodiment, an AE area (an AE target area) utilized in exposure control is decided from the area F1 in such a manner that comparatively accurate exposure control is performed. Exposure control is carried out in such a manner that the image within the AE area decided will take on the appropriate brightness.

As illustrated in FIG. 2B, a face-detection standardized image i1 is the result of standardizing the subject image I1. The subject image I1 is standardized in such a manner that the amount of data in the face-detection standardized image i1 will be constant (e.g., 1 MB). An area f1 corresponding to the area F1 detected in the subject image I1 is specified in the face-detection standardized image i1. An AE area AE1 is decided by reducing the size of the area f1. Since the AE area AE1 is smaller than the area f1, it can be understood that performing exposure control based upon the image within the AE area AE1 will exclude the effects of the image 27 of the tree and result in a face-image portion having appropriate brightness.

Figure 4A:
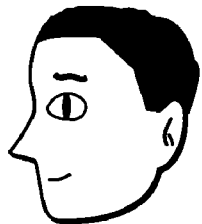
FIG. 4A illustrates a face-image portion that is oriented to the left, FIG. 4B a face-image portion that is oriented toward the front, and FIG. 4C a face-image portion that is oriented to the right.
Figure 4B:
Figure 4C:
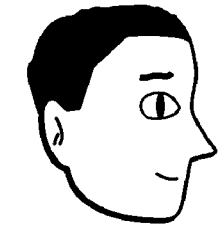

FIG. 3 illustrates an example of information indicating results of face detection. The information indicating results of face detection includes the number of detected faces (face-image portions), the position of each face, the size of each face, the detection score of each face, the orientation of each face and the inclination of each face, etc. An upper limit on the number of faces detected is decided. A number up to the upper-limit value decided is detected-result information indicative of the number of faces. The position of each face is indicated by the coordinates of the center of the face in the coordinate system of the face-detection standardized image. The size of each face is represented by half of one side of the rectangle of area f1 detected as the face-image portion, i.e., by the distance from the center of area f1 to the side of area f1. The detection score of each face represents an indicator, which is obtained in face detection processing, indicating the degree to which a portion of an image is face-like. The orientation of each face indicates whether the face-image portion is oriented to the left, oriented toward the front or oriented to the right, as illustrated in FIGS. 4A, 4B and 4C, respectively. The inclination of each face indicates the angle of rotation of the face-image portion so as to indicate whether the face-image portion has an inclination of 0° (upright), an inclination of 30°, an inclination of 60° or an inclination of 90°, as illustrated in FIGS. 5A, 5B, 5C and 5D, respectively. Although face orientation is indicated in units of 30°, inclination may be represented in units other than units of 30°.

FIG. 6 illustrates the relationship between areas detected as face images and AE areas utilized in exposure control. In order to facilitate understanding, face-image portions corresponding to areas detected as face images are also indicated.

In a case where the orientations are 0° (oriented toward the front), 90° (oriented to the right) and −90° (oriented to the left), the information is indicated upon being divided into that which prevails when the inclinations are 0°, 90°, 180° and 270° (here assumed to be 0°, etc.) and that which prevails when the inclinations are other than 0°, 90°, 180° and 270° (here assumed to be other than 0°, etc.).

In case of an orientation of 0° and an inclination of 0°, as indicated by a face-image portion 31, we have b=k31×a, where a represents the length of half of one side of an area f31 of the face-image portion that is the detected rectangle and b represents the length of half of one side of a rectangular AE area AE31. It should be noted that k31 is a constant greater than 0, although it may be less than 1 or equal to or greater than 1. The coefficient k31 would be decided on as an appropriate value in accordance with the size of area f31 detected in face detection processing (the size of a face detection frame used in face detection). Further, if we let the coordinate positions of the apices P1, P2, P3 and P4 of the AE area AE31 be represented by (P1x,P1y), (P2x,P2y), (P3x,P3y) and (P4x, P4y), respectively, and let the coordinate position of the center C of area f1 detected as the face-image portion be represented by (P0x,P0y), then we will have the following: P1x=P0x−b, P1y=P0y−b, P2x=P0x+b, P2y=P0y−b, P3x=P0x−b, P3y=P0y+b, P4x=P0x+b, P4y=P0y+b.

In case of an orientation of 0° and an inclination of 30° (−30°), as indicated by a face-image portion 32, we have b=k32×a (where k32 is a constant). If we let the coordinate positions of the apices P1, P2, P3 and P4 of an AE area AE32 be represented by (P1x,P1y), (P2x,P2y), (P3x,P3y) and (P4x, P4y), respectively, let c represent the length of half of one side of the AE area AE32, and let the coordinate position of the center C of area f32 detected as the face-image portion be represented by (P0x,P0y), then we will have the following: P1x=P0x−c, P1y=P0y−c, P2x=P0x+c, P2y=P0y−c, P3x=P0x−c, P3y=P0y+c, P4x=P0x+c, P4y=P0y+c.

In case of an orientation of 90° (an orientation equal to or greater than 0°) and an inclination of 0°, as indicated by a face-image portion 33, an area f33 detected as the face-image portion will be a pentagon. If we let a represent the distance from the center C of the face-image portion to the top side in FIG. 6, d the distance from the center of the face-image portion to the top side, bottom side or left side of an AE area AE33, and e the distance from the center of the face-image portion to the right side of the AE area AE33, then we will have d=k33A×a, e=k33B×a (where k33A, k33B are constants). If we let the coordinate positions of the apices P1, P2, P3 and P4 of the AE area AE33 be represented by (P1x,P1y), (P2x,P2y), (P3x,P3y) and (P4x,P4y), respectively, and let the coordinate position of the center C of area f1 detected as the face-image portion be represented by (P0x,P0y), then we will have the following: P1x=P0x−d, P1y=P0y−d, P2x=P0x+e, P2y=P0y−d, P3x=P0x−d, P3y=P0y+d, P4x=P0x+e, P4y=P0y+d. In this case, the face-image portion represents a profile. Therefore, the AE area AE33 is shifted toward the left side so that a background image will not enter the AE area A33, and the center of the AE area A33 and center C of the face-image portion do not coincide. It goes without saying, however, that the two centers may of course be made to coincide.

In case of an orientation of 90° and an inclination of 30° (−30°), as indicated by a face-image portion 34, an area f34 detected as the face-image portion will be a pentagon. If we let a represent the distance from the center C of the face-image portion to a long side of area f34 (any side other than the two short sides) and let f represent half of one side in a case where an AE area AE34 is a rectangle, then we have f=k34c×a (where k34 is a constant). If we let the coordinate positions of the apices P1, P2, P3 and P4 of the AE area AE34 be represented by (P1x,P1y), (P2x,P2y), (P3x,P3y) and (P4x,P4y), respectively, and let the coordinate position of the center C of area f1 detected as the face-image portion be represented by (P0x,P0y), then we will have the following: P1x=P0x−f, P1y=P0y−f, P2x=P0x+f, P2y=P0y−f, P3x=P0x−f, P3y=P0y+f, P4x=P0x+f, P4y=P0y+f. In FIG. 6, the AE area AE34 is a rectangle and the direction of the sides thereof is the horizontal direction or the vertical direction. However, the area AE34 may be tilted to conform to the area f34.

In case of an orientation of 90° (an orientation equal to or greater than 0°) and an inclination of 0°, as indicated by a face-image portion 35, an area f35 detected as the face-image portion will be a pentagon. If we let a represent the distance from the center C of the face-image portion to the top side in FIG. 6, d the distance from the center of the face-image portion to the top side, bottom side or right side of an AE area AE35, and e the distance from the center of the face-image portion to the left side of the AE area AE35, then we will have d=k35A×a, e=k35B×a (where k35A, k35B are constants). If we let the coordinate positions of the apices P1, P2, P3 and P4 of the AE area AE35 be represented by (P1x,P1y), (P2x,P2y), (P3x,P3y) and (P4x,P4y), respectively, and let the coordinate position of the center C of area f1 detected as the face-image portion be represented by (P0x,P0y), then we will have the following: P1x=P0x−e, P1y=P0y−d, P2x=P0x+d, P2y=P0y−d, P3x=P0x−e, P3y=P0y+d, P4x=P0x+d, P4y=P0y+d. In this case, the face-image portion represents a profile. Therefore, the AE area AE35 is shifted toward the right side so that a background image will not enter the AE area A35, and the center of the AE area A35 and center C of the face-image portion do not coincide. It goes without saying, however, that the two centers may of course be made to coincide.

In case of an orientation of −90° and an inclination of 30° (−30°), as indicated by a face-image portion 36, an area f36 detected as the face-image portion will be a pentagon. If we let a represent the distance from the center C of the face-image portion to a long side of area f36 (any side other than the two short sides) and let f represent half of one side in a case where an AE area AE36 is a rectangle, then we have f=k36c×a (where k36 is a constant). If we let the coordinate positions of the apices P1, P2, P3 and P4 of the AE area AE36 be represented by (P1x,P1y), (P2x,P2y), (P3x,P3y) and (P4x,P4y), respectively, and let the coordinate position of the center C of area f1 detected as the face-image portion be represented by (P0x,P0y), then we will have the following: P1x=P0x−f, P1y=P0y−f, P2x=P0x+f, P2y=P0y−f, P3x=P0x−f, P3y=P0y+ f, P4x=P0x+f, P4y=P0y+f. In FIG. 6, the AE area AE36 is a rectangle and the direction of the sides thereof is the horizontal direction or the vertical direction. However, the area AE36 may be tilted to conform to the area f36.

Thus, an AE area AE31, etc., which is use in exposure control, is decided from area f31, etc., which has been detected as a face-image portion. AE areas are decided in a similar manner also in cases where the face-image portion has other orientations or inclinations.

Figure 7:
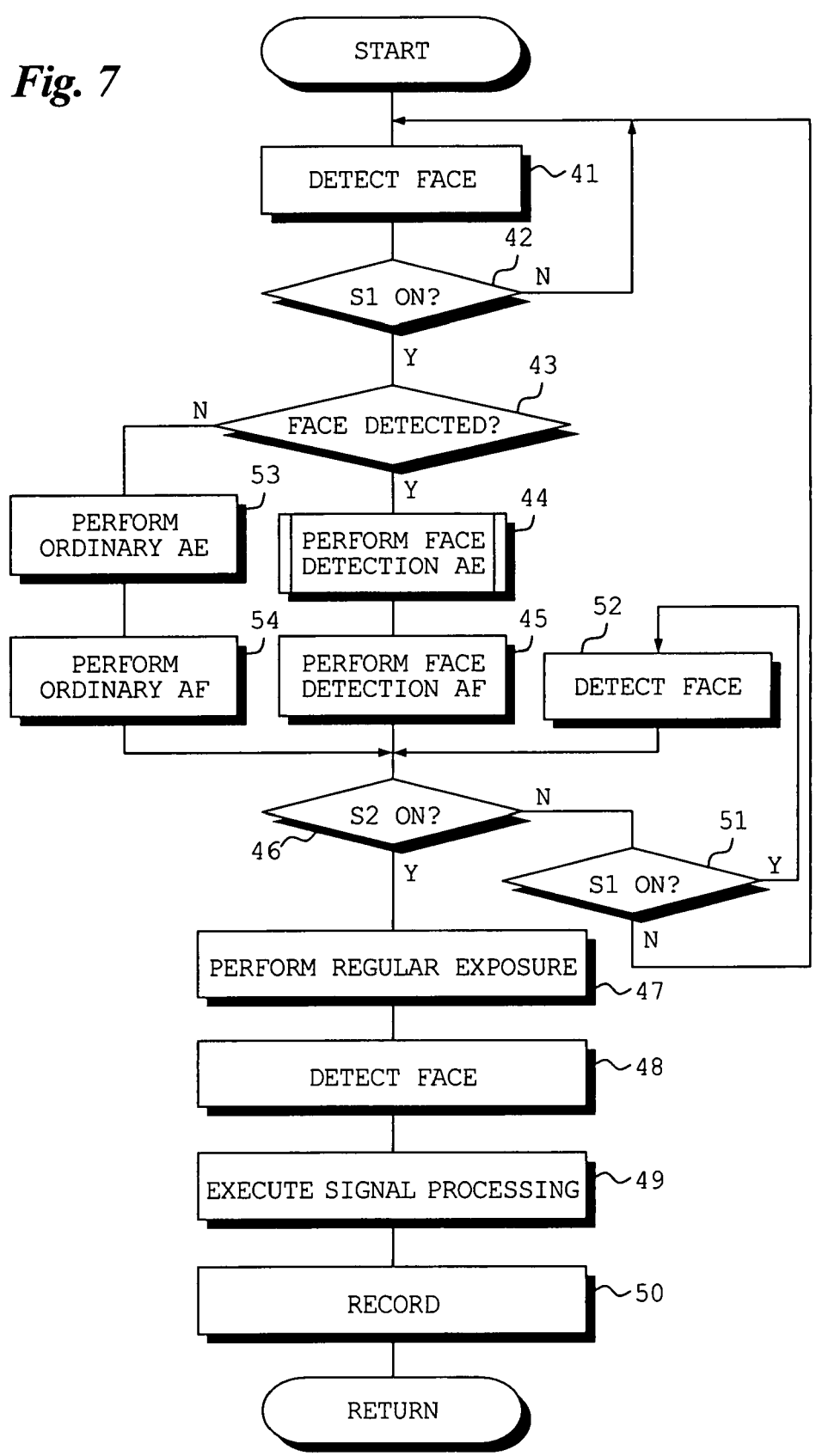
FIG. 7 is a flowchart illustrating processing executed by the digital still camera.

FIG. 7 is a flowchart illustrating processing executed by the digital still camera.

If the image sensing mode is set and the image of a subject is sensed, processing for detecting a face in the image of the subject thus obtained is executed (step 41). If the shutter-release button is pressed through the first step of its stroke ("YES" at step 42), whether a face-image portion has been detected by face detection processing is checked (step 43). If a face-image portion has been detected ("YES" at step 43), then automatic exposure control that takes the face-image portion into account (namely face-detection AE) is executed (step 44). The details of face-detection as will be described later. Next, automatic focusing control that takes the face-image portion into account (namely face detection AF) is executed (step 45). If a face-image portion has not been detected ("NO" at step 43), ordinary AE and AF, which do not take a face-image portion into account, are carried out (steps 53, 54).

If the shutter-release button is not pressed through the second step of its stroke ("NO" at step 46) and is still being pressed through the first stage of its stroke ("YES" at step 51), face detection processing is executed again (step 52). If the shutter-release button is released from depression through the first step of its stroke ("NO" at step 51), then processing from step 41 onward is repeated.

If the shutter-release button is pressed through the second step of its stroke ("YES" at step 46), the present exposure operation is carried out (step 47). Detection of a face-image portion is subsequently performed again based upon the image data obtained by this exposure operation (step 48), then a color correction and other signal processing are applied in such a manner that the detected face-image portion will become an attractive image (step 49). The image data that has undergone signal processing is recorded on a memory card (step 50).

In FIG. 7, processing for face-detection AE is executed in response to depression of the shutter-release button through the first step of its stroke. However, the above-described processing for face-detection AE can be executed also with regard to an image (a so-called "through image") obtained by image sensing prior to depression of the shutter-release button in a case where the image sensing mode has been set. In a case where face-detection AE processing is applied to a through image, the face-detection AE processing would be executed before the shutter-release button is pressed.

Figure 8:
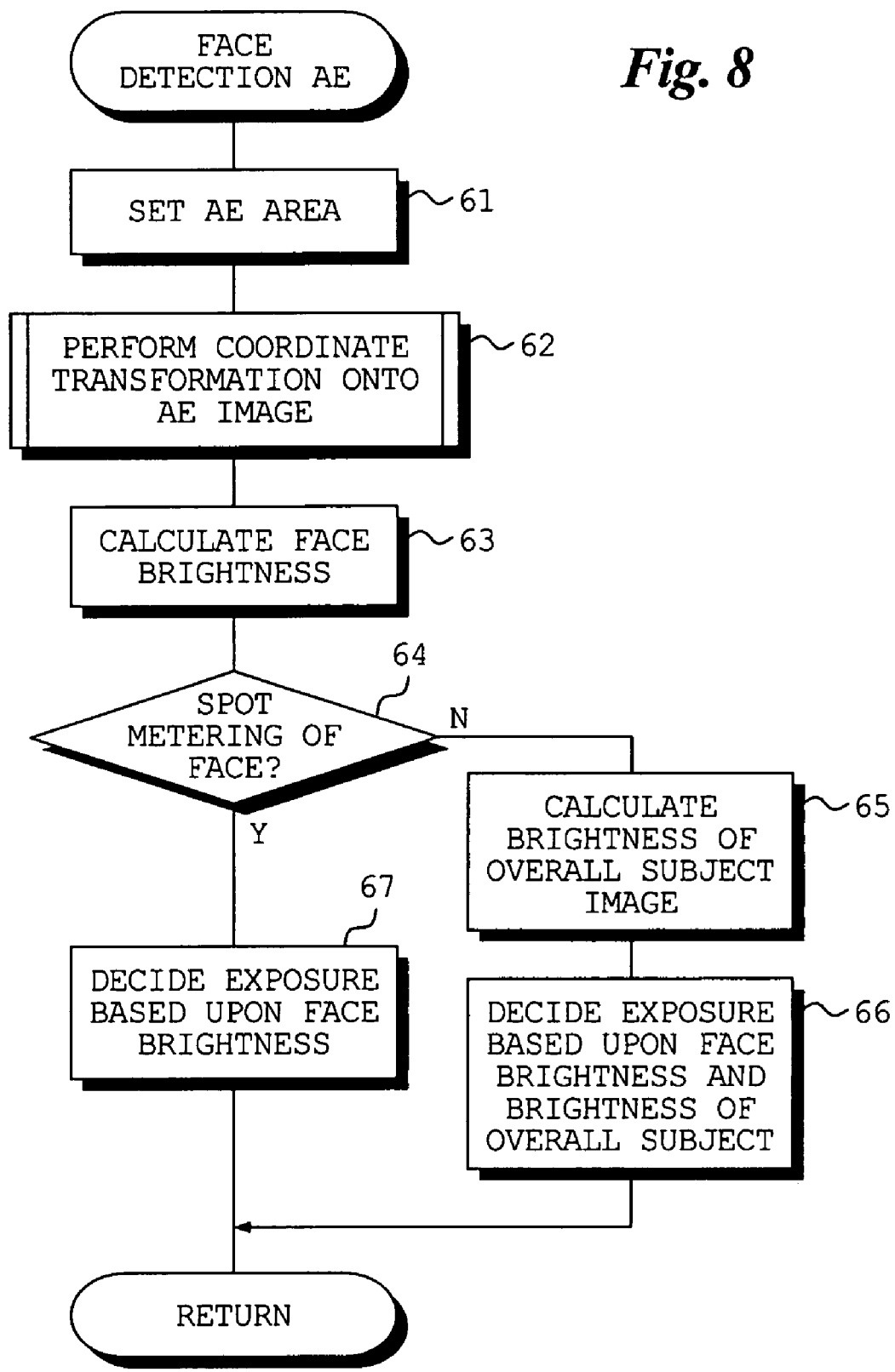
FIG. 8 is a flowchart illustrating face-detection AE processing.

FIG. 8 is a flowchart illustrating processing for face-detection AE (the processing at step 44 in FIG. 7).

An AE area is set from an area detected as a face-image portion in the manner described above (step 61). The AE area is set on a face-detection standardized image in the manner described above. By contrast, with automatic exposure control, operation is performed using an AE image having a coordinate system different from the coordinate system of the face-detection standardized image. For this reason, coordinate transformation processing is executed in such a manner that the AE area that has been set on the face-detection standardized image will be set on the AE image (step 62). The details of coordinate transformation processing will be described later. Face brightness is calculated based upon the image data representing the image within the AE area that has been set on the AE image (step 63).

If the camera has not been set so as to perform face spot metering ("NO" at step 64), automatic exposure control is carried out based upon the face-image portion and the overall image of the subject. The brightness of the overall image of the subject, therefore is calculated (step 65). Exposure control is performed based upon the calculated brightness of the overall image of the subject and the brightness of the image within the AE area (the finally decided face-image portion) (step 66).

If the camera has been set so as to perform face spot metering ("YES" at step 64), then exposure control is performed based upon the brightness of the image within the AE area (step 67).

Figure 9:
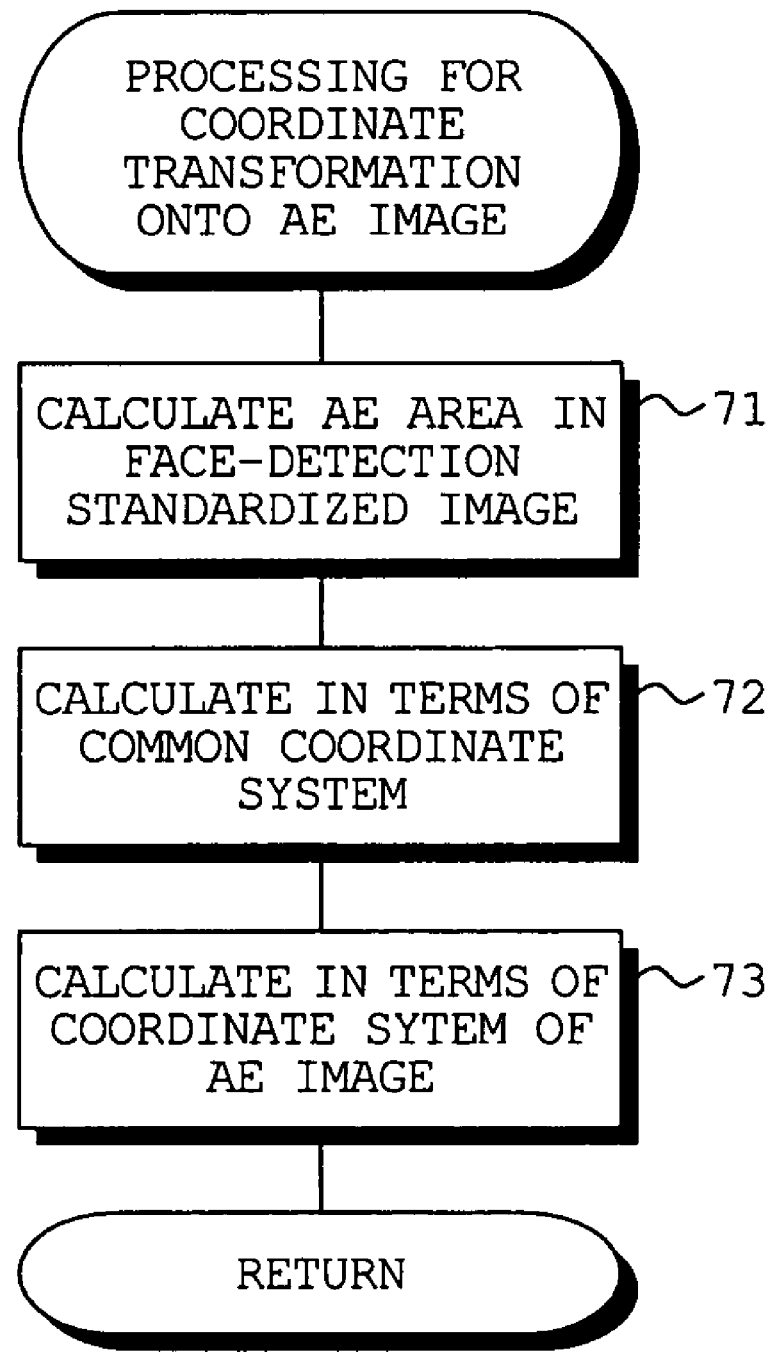
FIG. 9 is a flowchart illustrating processing for a coordinate transformation onto an AE image.
Figure 10:
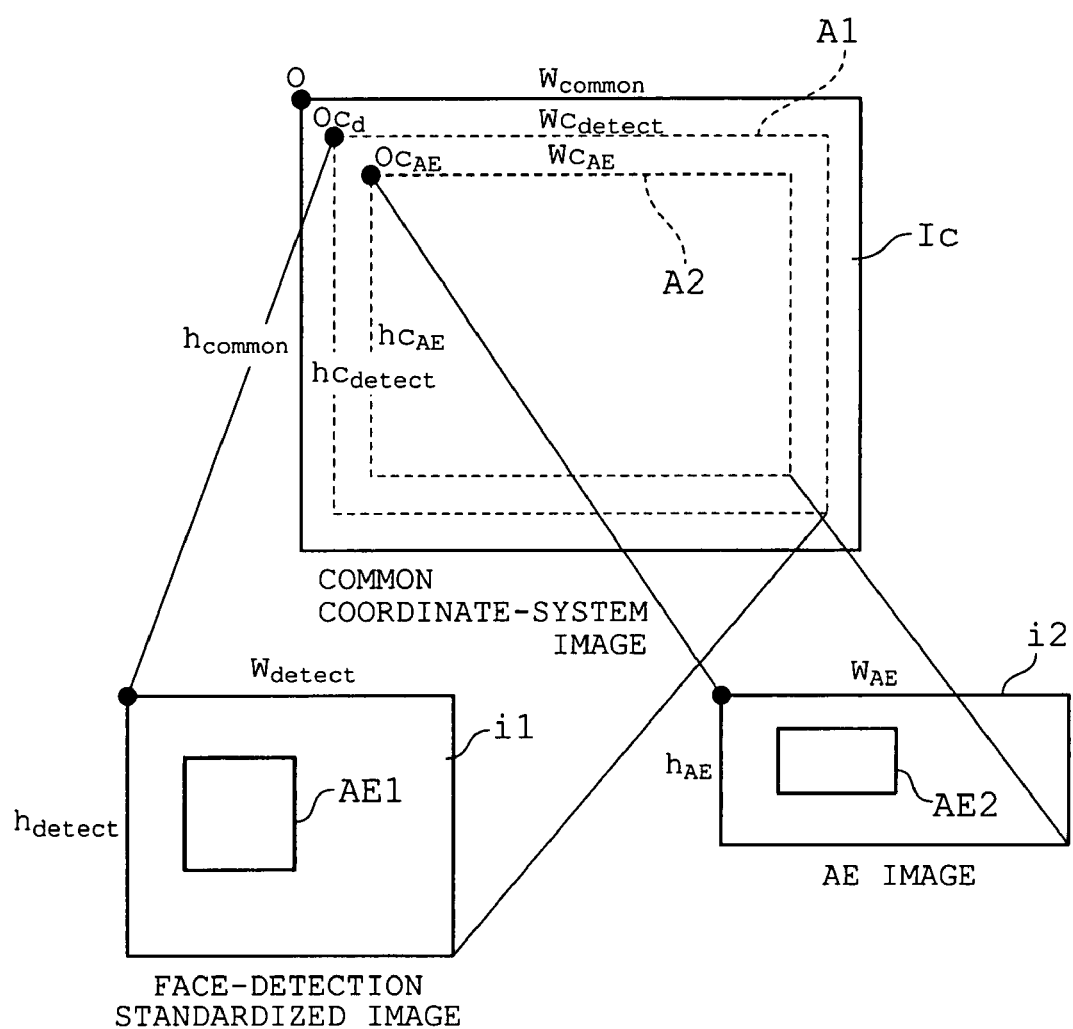
FIG. 10 illustrates how a coordinate transformation is performed.

FIG. 9 is a flowchart illustrating processing for the coordinate transformation onto the AE image (the processing at step 62 in FIG. 8), and FIG. 10 illustrates the manner in which the AE area that has been set on the face-detection standardized image is set on the AE image.

First, AE area AE1 is set on face-detection standardized image i1 (step 71; step 61 in FIG. 8). Coordinate transformation processing is executed in such a manner that the AE area AE1 on the face-detection standardized image i1 is set on an image in a common coordinate system (namely on a common-coordinate image Ic) (step 72). When the AE image is set on the common-coordinate image Ic, next a coordinate transformation is performed so as to set an AE area AE2 on an AE image i2 (step 73).

With reference to FIG. 10, the AE area AE1 is set on the face-detection standardized image i1. It is assumed that the face-detection standardized image i1 corresponds to the image portion of area A1 in the common-coordinate image Ic. Accordingly, coordinates (xd,yd) on the face-detection standardized image become coordinates (xc,yc) on the common-coordinate image. Here the following holds: xc=(xd+0.5)× wc_detect/wdetect−0.5+oc_d_x, yc=(yd+0.5)×hc_detect/ hdetect−0.5+oc_d_y. The AE area AE1 is coordinate-transformed to the common coordinate system in accordance with these equations.

The AE area AE1 that has undergone the coordinate transformation to the common coordinate system is coordinate-transformed to the AE area AE2 in the AE coordinate system. The coordinates (xc,yc) on the common-coordinate image become coordinates (xAE,yAE) of the AE image i2. Here xAE=(xc−oc_AE_x+0.5)×wAE/wc_AE−0.5, yAE=(yc− oc_AE_y+0.5)×hAE/hc_AE−0.5. The AE area AE1 is set in the AE image i2 in accordance with these equations.

In the equations cited above, Wc_detect indicates the horizontal length of area A1 in the common-coordinate image, Wdetect indicates the horizontal length of the face-detection standardized image, hc_detect indicates the horizontal length of area A1 in the common-coordinate image, hdetect indicates the vertical length of the face-detection standardized image, 0c_d_x indicates the x coordinate of the origin of area A1, 0c_d_y indicates the y coordinate of the origin of area A1, 0c_AE_x indicates the x coordinate of the origin of area A2, 0c_AE_y indicates the y coordinate of the origin of area A2, wAE indicates the horizontal length of the AE image, hAE indicates the vertical length of the AE image, wc_AE indicates the horizontal length of area A2, and wc_AE indicates the vertical length of area A2.

It goes without saying that if the face-detection standardized image and the AE image are in the same coordinate system, coordinate transformation processing is unnecessary.

Figure 11:
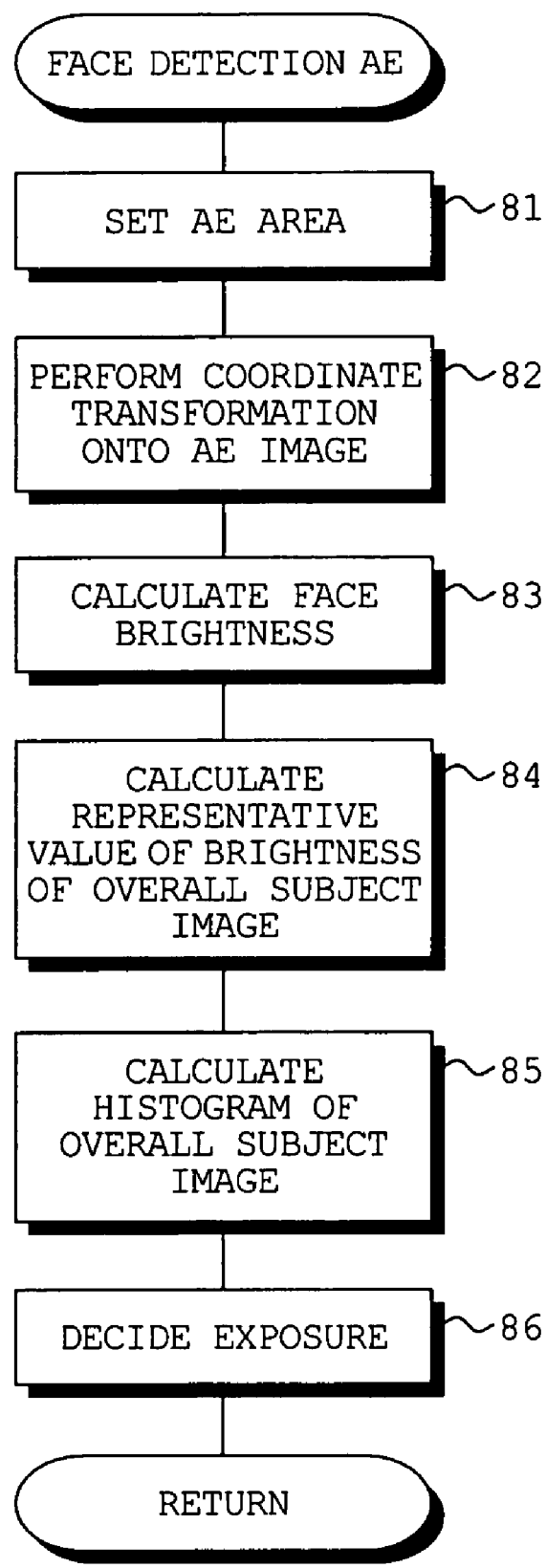
FIG. 11 is a flowchart illustrating face-detection AE processing.

FIGS. 11 to 13 illustrate another embodiment. This embodiment controls exposure based upon a face-image portion and the overall image of a subject.

As described above, an AE area is set (step 81) and a coordinate transformation onto an AE image is performed (step 82). The brightness of the face-image portion (the image within the AE area) is calculated (step 83) and a representative value of brightness of the overall image of the subject is calculated (step 84). Furthermore, a histogram of the overall image of the subject is calculated (step 85). Exposure is decided using the brightness of the face-image portion, the representative value of brightness of the overall image of the subject and the histogram of the overall image of the subject thus obtained (step 86). A method of calculating these will be described later.

Of course, exposure may be decided without using all of the above, namely the brightness of the face-image portion, the representative value of brightness of the overall image of the subject and the histogram of the overall image of the subject. Exposure may be decided using the brightness of the face-image portion and either the representative value of brightness of the overall image of the subject or the histogram of the overall image of the subject.

Figure 12A:
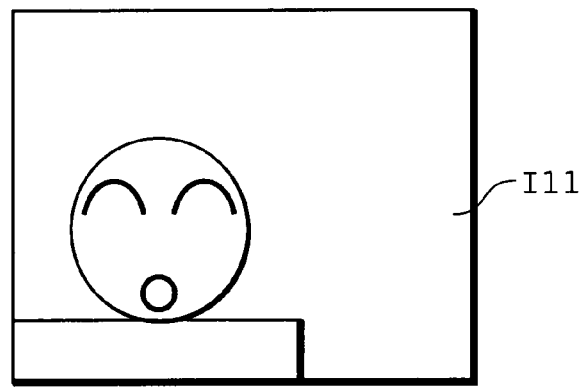
FIGS. 12A to 12C illustrate examples of images of a subject.
Figure 12B:
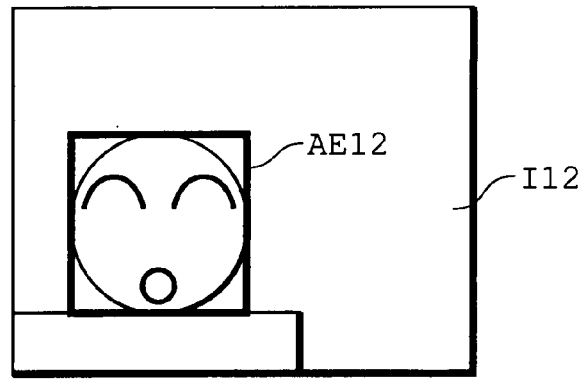
Figure 12C:
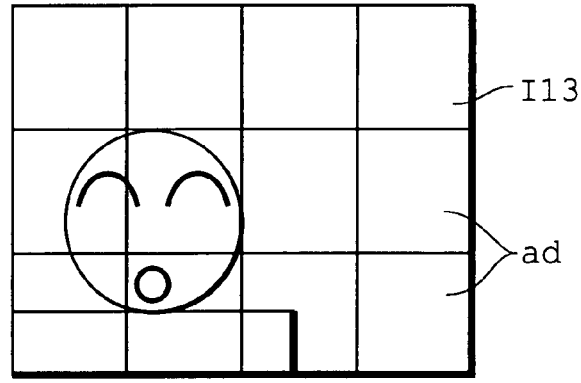

FIG. 12A illustrates an example of a subject image (face-detection standardized image) I11, FIG. 12B an example of a subject image I12 in which AE area AE12 has been set, and FIG. 12C an example of a subject image I13 that has been divided into areas.

If the subject image I11 is obtained, as illustrated in FIG. 12A, the AE area AE12 is set in the subject image I12 in the manner described above, as illustrated in FIG. 12B. Furthermore, a subject image I13 is divided into a plurality of areas ad, as illustrated in FIG. 12C.

Brightness Evtotal for exposure control can be found from Equation (1) below based upon an image (brightness of the face-image portion) Evface within the AE area AE12 and a representative value Evfull of the overall image of the subject as mentioned above. In Equation (1), wface and wfull are weighting coefficients.

$$EV_{total} = \log_2 \left[ \frac{w_{face} \cdot 2^{EV_{face}} + w_{full} \cdot 2^{EV_{full}}}{w_{face} + w_{full}} \right]$$ Equation (1)

Further, in a case where brightness Evtotal for exposure control is obtained from the image (brightness of the face-image portion) Evface within the AE area A12 and a histogram of the overall image of the subject, Evtotal can be found from Equation (2) below, where Evarea represents a photometric value of the divided area ad.

$$EV_{total} = f(EV_{face}, EV_{area}[i])$$ Equation (2)

Furthermore, brightness Evtotal for exposure control can also be found from the image (brightness of the face-image portion) Evface within the AE area AE12, the representative value Evfull of the overall image of the subject, the histogram of the overall image of the subject and information concerning results of face detection (number of face-image portions, position and size of each face, degree to which the image is face-like, and inclination and orientation of each face, etc.). In this case, Evtotal can be found from Equation (3) below.

$$EV_{total} = f(EV_{face}, EV_{full}, EV_{area}[i], face\_data)$$ Equation (3)

For example, in a case where the number of face-image portions is small and the sizes of the faces are large or a case where the degree to which the image portion is face-like is high, exposure would be controlled so as to make the faces comparatively bright. Conversely, in a case where the number of face-image portions is large and the sizes of the faces are small or a case where the degree to which the image portion is face-like is low, exposure would be controlled so as to make the faces comparatively dark.

Although the weighting coefficients in Equation (1) and the functions of Equations (2) and (3) can be set freely, precision is raised by utilizing values learned in advance.

Further, in a case where the brightness Evface of a face-image portion can be acquired directly, it will suffice to use this value. If this cannot be acquired directly, however, then it can be calculated from Equation (4) below.

$$EV_{face} = \log_2 \left[ \frac{\sum_{i=0}^{N-1} (w_{area}[i] \cdot 2^{EV_{area}[i]})}{\sum_{i=0}^{N-1} (w_{area}[i])} \right]$$ Equation (4)

In Equation (4), Evarea[i] is dependent upon areas aa to af, which are indicated by hatching in the relationship between subject images and AE areas in FIGS. 13A to 13F.

In FIGS. 13A to 13F, the area has been divided in all of subject images IA to IF.

In FIGS. 13A and 13B, use is made of brightness information in divided areas within AE area AEa and AE area AEb and in circumscribing divided areas aa and ab.

In FIGS. 13C and 13D, use is made of brightness information in divided areas ac and ad containing the centers of AE area AEc and AE area AEd, respectively.

In FIGS. 13A to 13D, divided areas aa to ad indicated by the hatching are such that i=1 holds in the above-mentioned Evarea[i], and i=0 holds in the other divided areas.

In FIGS. 13E and 13F, use is made of brightness information of images within AE area AEe and AE area AEf. In this case, Evarea[i] becomes (area of overlap between the applicable divided area ae or af and the face-image portion)/(area of applicable divided area ae or af).

Figure 14:
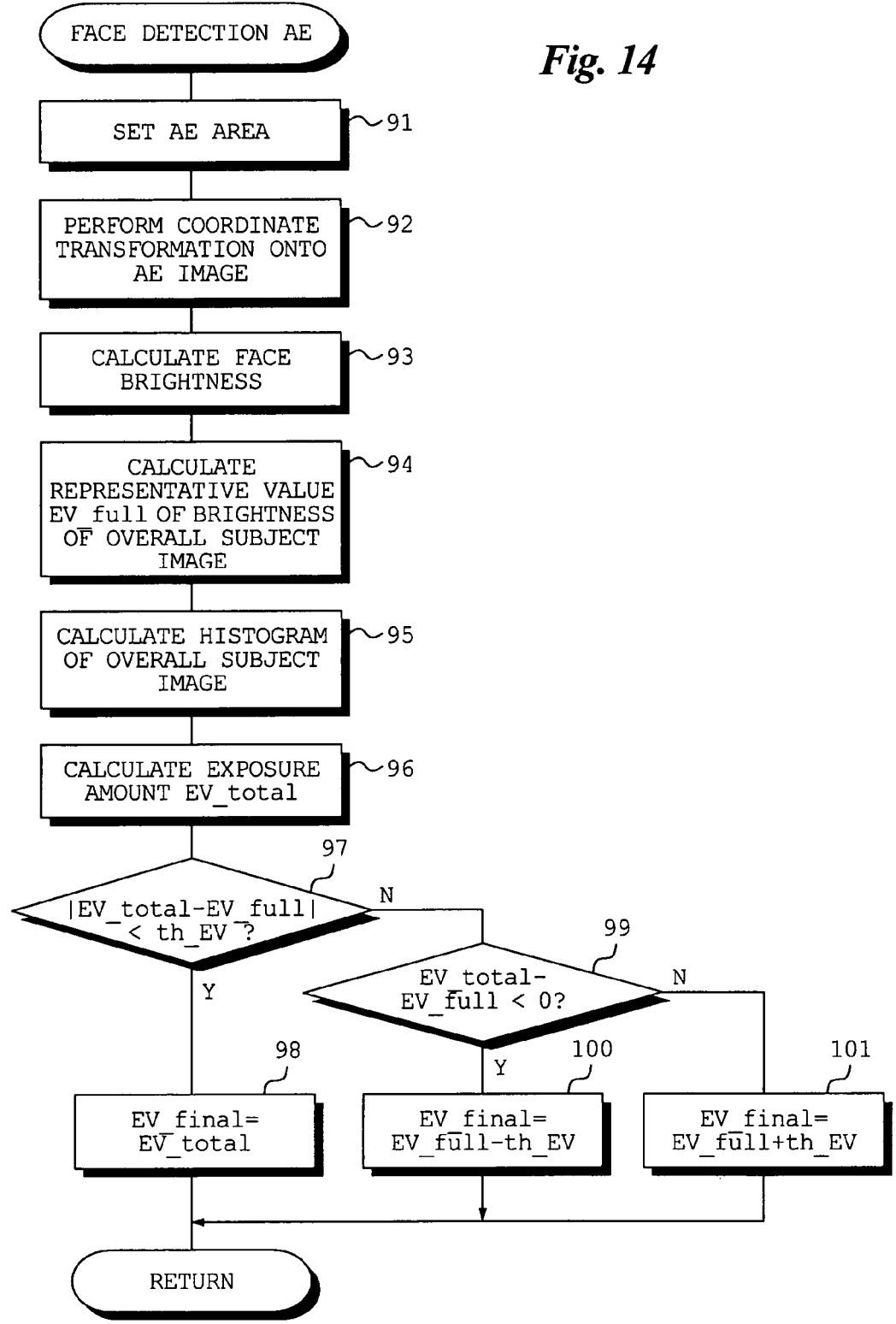
FIG. 14 is a flowchart illustrating face-detection AE processing.

FIG. 14 is a flowchart illustrating processing for face-detection AE according to another embodiment. This embodiment calculates brightness EVfinish (where EVfinish represents brightness for the exposure that is finally decided) used in exposure control in such a manner that the difference between the calculated brightness EVtotal for exposure and brightness EVfull of the overall image of the subject will fall within a prescribed range.

As mentioned above, an AE area is set (step 91) and the set AE area is coordinate-transformed onto an AE image (step 92). The brightness of the face-image portion (the brightness of the image within the AE area) is calculated (step 93) and the representative value EVfull of brightness of the overall image of the subject is calculated (step 94). Furthermore, a histogram of the overall image of the subject is calculated (step 95). The brightness EVtotal for exposure is calculated in the manner described above using the obtained brightness EVface of the face-image portion, representative value EVfull of brightness of the overall image of the subject and histogram of the overall image of the subject (step 96). If the difference (|EVtotal−EVfull|) between the calculated brightness EVtotal for exposure and representative value EVfull of brightness of the overall image of the subject is equal to or greater than a predetermined threshold value thEV ("NO" at step 97), then it is construed that the calculated brightness EVtotal for exposure does not represent a brightness for performing appropriate exposure owing to the fact that a portion that is not a face-image portion has been detected erroneously as a face image; a face-image portion has not yet been detected as a face image; the brightness of the detected face-image portion has fluctuated; or background has intruded into the face-image portion. Consequently, brightness EVfinal used in final exposure is calculated in such a manner that the brightness used in exposure will not depart much from the brightness of the overall image of the subject.

If the calculated brightness EVtotal for exposure is less than the representative value EVfull of brightness of the overall image of the subject ("YES" at step 99), then the predetermined threshold value thEV is subtracted from brightness EVfull of the overall image of the subject in order that brightness EVfinal used in final exposure will approach the representative value EVfull of brightness of the overall image of the subject (step 100). Conversely, if the calculated brightness EVtotal is equal to or greater than the representative value EVfull of brightness of the overall image of the subject ("NO" at step 99), then the predetermined threshold value thEV is added to brightness EVfull of the overall image of the subject in order that brightness EVfinal used in final exposure will approach the representative value EVfull of brightness of the overall image of the subject (step 101).

In the example set forth above, the predetermined value (thEV) subtracted from and added to the calculated brightness EVtotal for exposure is the same. However, the subtracted value and the added value may be made different from each other. Further, although the size relationship between the calculated brightness EVtotal and the representative value EVfull of brightness of the overall image of the subject is judged, the size relationship between the calculated brightness EVtotal and the face-image portion EVface may be judged.

Figure 15:
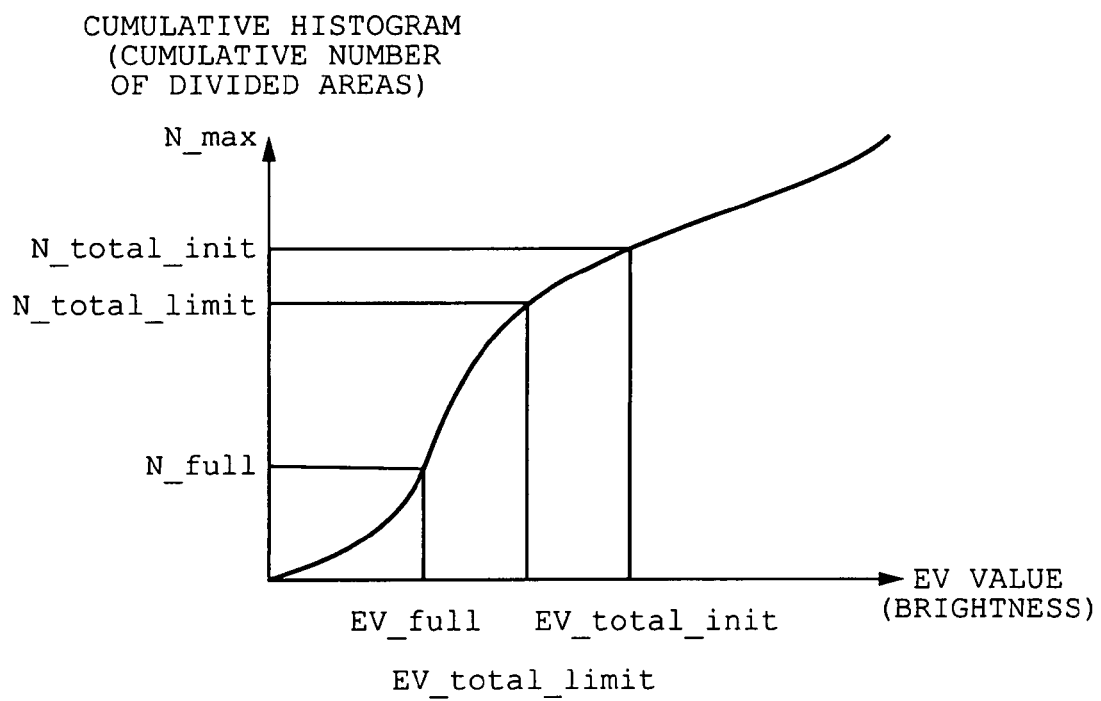
FIG. 15 illustrates the relationship between brightness and a cumulative histogram.
Figure 16:
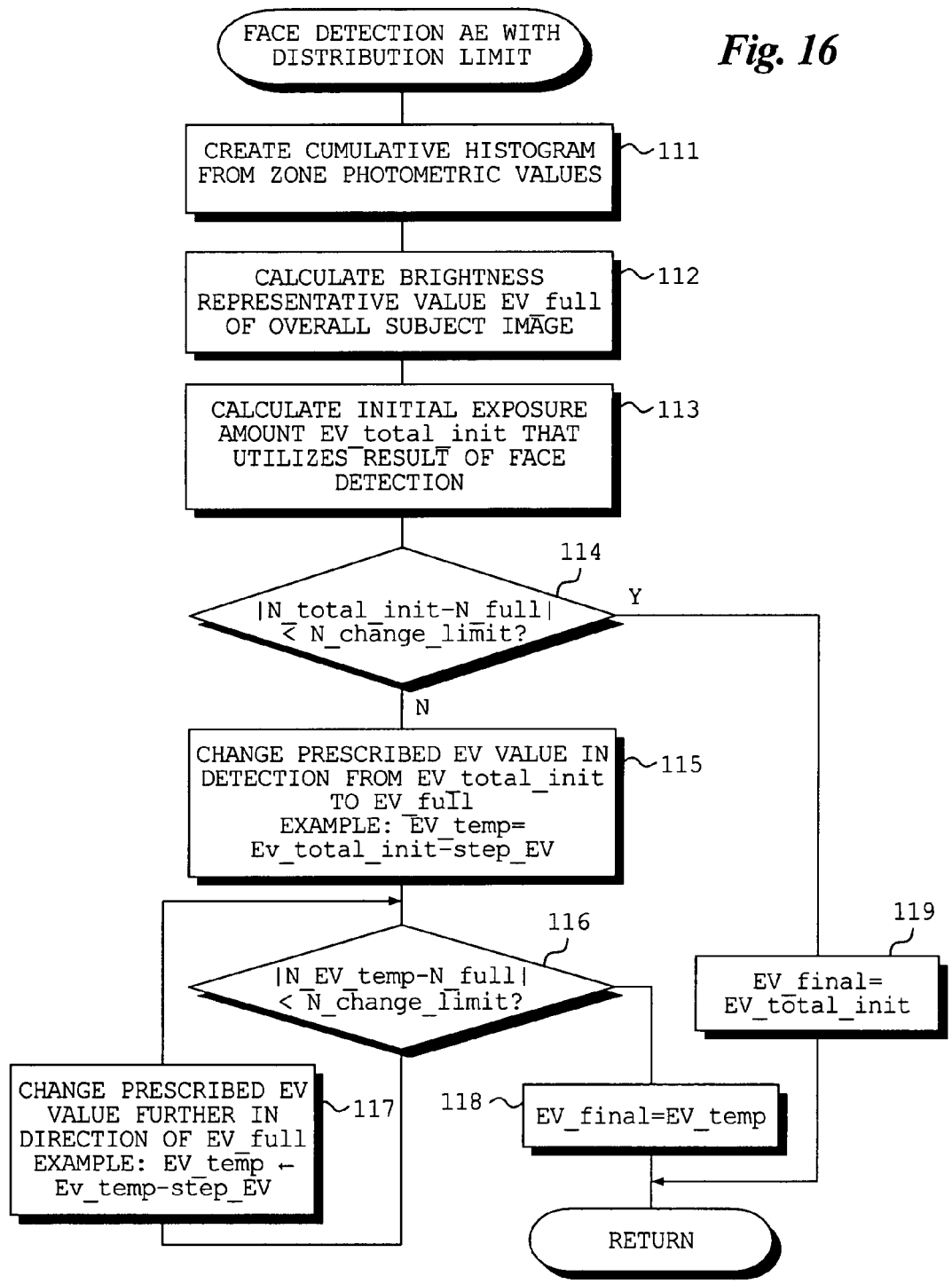
FIG. 16 is a flowchart illustrating face-detection AE processing.

FIGS. 15 and 16 illustrate another embodiment of the invention. This embodiment is so adapted that cumulative frequency in a subject image of calculated brightness for exposure will fall below a prescribed frequency. This embodiment also makes it possible to prevent calculated brightness for exposure from becoming too bright.

FIG. 15 illustrates the relationship between brightness (EV value) and a cumulative histogram (cumulative frequency) of this brightness in the image of a subject.

Cumulative frequency at brightness EVfull of the overall image of the subject is represented by Nfull, and cumulative frequency at brightness EVtotalinit (here it is assumed that EVtotalinit holds) for exposure calculated taking the face-image portion into account in the manner described above is represented by Ntotalinit. If we let EVtotallimit represent brightness in a case where it is so arranged that the cumulative frequency falls below the prescribed frequency, as mentioned above, then the cumulative frequency will be Ntotallimit. Calculated brightness EVtotalinit for exposure is corrected in such a manner that cumulative frequency Ntotalinit of calculated brightness EVtotalinit for exposure will fall below cumulative frequency Nfull at brightness EVfull of the overall image of the subject.

FIG. 16 is a flowchart illustrating processing for correcting calculated brightness.

The image of a subject is divided into a plurality of areas and a cumulative histogram is created using the zone photometric values obtained (step 111). The brightness representative value EVfull of the overall image of the subject is calculated (step 112) and the cumulative frequency Nfull corresponding to the brightness representative value EVfull is obtained. Further, brightness EVtotalinit, which is calculated taking the face-image portion into account in the manner described above, is calculated (step 113) and the cumulative frequency Ntotalinit corresponding to this brightness EVtotalinit is obtained.

It is determined whether the difference (|Nfull−Ntotalinit|) between the obtained cumulative frequency Nfull and Ntotalinit is less than a prescribed value Nchangelimit (step 114).

If the difference is equal to or greater than the prescribed value ("NO" at step 114), then, in a case where the subject image obtained when exposure control is performed based upon the calculated brightness is too bright, this case is construed to be a case of erroneous detection or one in which detection has not been performed, as described above. Therefore, the calculated brightness EVtotalinit is corrected in such a manner that the brightness EVfull of the overall image of the subject is approached (specifically, EVtemp=EVtotalinit−stepEV, where EVtemp represents the corrected brightness and stepEV the amount of correction) (step 115).

It is determined whether the difference (|NEVtemp−Nfull|) between cumulative frequency NEVtemp of the corrected brightness EVtemp and cumulative frequency Nfull of the brightness representative value EVfull of the overall image of the subject is less than the prescribed value Nchangelimit (step 116). If the difference is not less than the prescribed value ("NO" at step 116), then the corrected brightness EVtemp is corrected further (step 117). If the difference is equal to or greater than the prescribed value ("YES" at step 116), then it is considered that the corrected brightness EVtemp is a comparatively appropriate brightness and this is decided upon as the final brightness for exposure (step 118).

If the difference (|Nfull−Ntotalinit|) between the obtained cumulative frequency Nfull and Ntotalinit is equal to or greater than the prescribed value Nchangelimit ("YES" at step 114), then it is considered that the initially calculated brightness EVtotalinit is comparatively appropriate. Accordingly, this brightness EVtotalinit is decided upon as the final brightness for exposure (step 119).

The value of the above-mentioned prescribed value Nchangelimit may be a fixed value or one that can be changed in accordance with the scene (e.g., in accordance with the calculated brightness EVtotalinit or brightness EVfull of the overall image of the subject). For example, if brightnesses EVtotalinit or EVfull are comparatively bright or comparatively dark, the prescribed value Nchangelimit can be diminished. At other times, Nchangelimit can be made comparatively large. Precision can be improved by calculating the prescribed value Nchangelimit in advance by learning. Further, it may be so arranged that the correction quantity step EV is changed in accordance with the sign of the difference between cumulative frequency Nfull and Ntotalinit, and the increase or decrease need not be in fixed amounts.

Figure 17A:
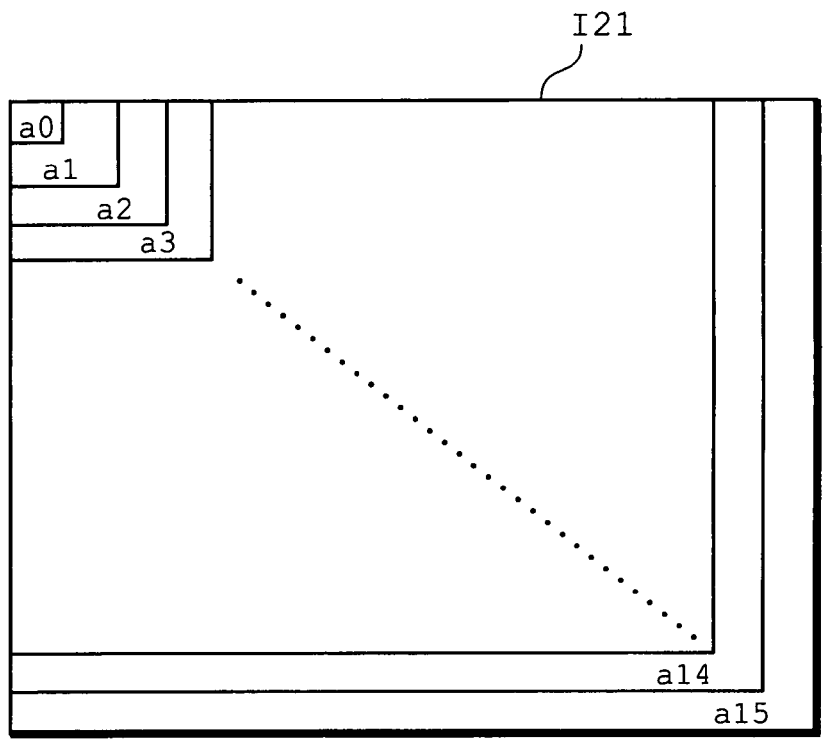
FIGS. 17A and 17B illustrate examples of images of a subject.
Figure 17B:
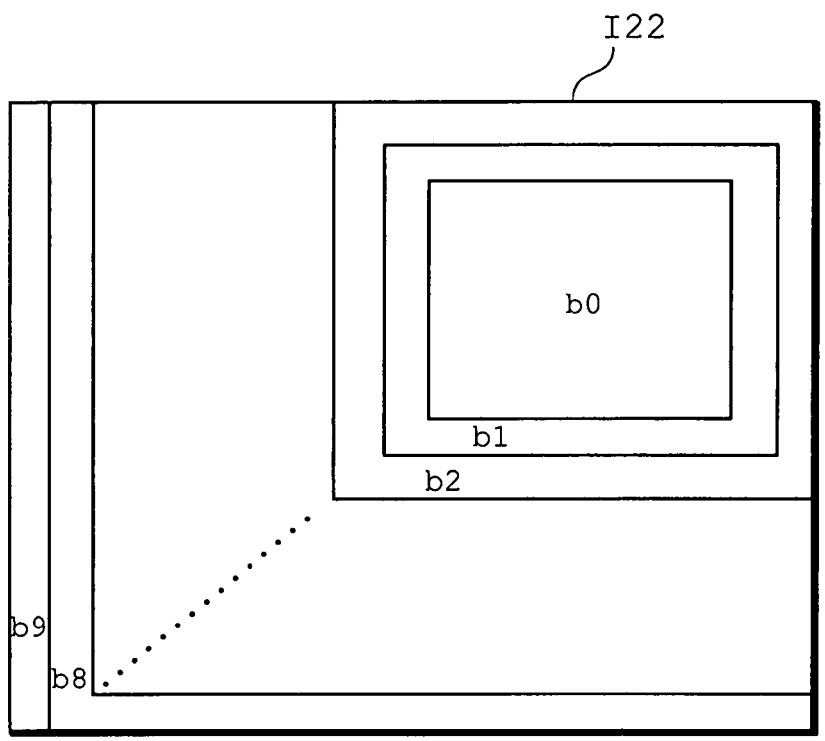

FIGS. 17A and 17B illustrate further embodiments of the invention and show examples of a divided subject image. In this embodiment, the brightness EVface of a face image is calculated by changing amount of weighting in accordance with distance from a detected face-image portion.

As shown in FIG. 17A, face-image detection processing is executed in a subject image 121 and it is assumed that a face-image portion has been determined to exist in an area a0 situated at the upper-left corner of the subject image 121. In this case, the subject image 121 is divided into a plurality (a maximum of 16) of areas inclusive of the area a0 in such a manner that a different area is reached as distance from the central area a0 increases. In this embodiment, division is into 16 areas (although it goes without saying that the subject image may be divided into another number of areas). Areas a0 to a15 are specified by this division. The brightness EVface of the face image is calculated in accordance with Equation (5) below using such weighting coefficients w0 to w15 of areas a0 to a15 that the amount of weighting increases as area a0, which is the area among the areas a0 to a15 in which the face-image portion has been determined to exist, is approached. The weighting coefficients w0 to w15 can be set beforehand in an EEPROM (Electronically Erasable and Programmable Read-Only Memory) provided in the digital still camera.

$$EV_{face} = \log_2 \frac{\sum (wf_i \cdot 2^{EV_i})}{\sum wf_i} \quad \text{Equation (5)}$$

As shown in FIG. 17B, face-image detection processing is executed in a subject image 122 and it is assumed that a face-image portion has been determined to exist in an area b0 slightly to the upper right of the center of the subject image 122. In this case, the subject image 122 is divided into a plurality areas b0, b1, b2, . . . b9 in a manner similar to that shown in FIG. 17A. The brightness EVface of the face-image portion is calculated in accordance with Equation (5) in a manner similar to that shown in FIG. 17A. The divided areas are ten in number, namely b0 to b9, and ten weighting coefficients w0 to w9 are utilized.

Thus, the brightness EVface of the face-image portion is calculated utilizing weighting coefficients that increase as the face-image portion is approached. Accordingly, even if the detected face-image portion does not agree with the rightful face-image portion, comparatively appropriate exposure control can be executed and a subject image having a comparatively appropriate brightness can be obtained.

FIGS. 18A to 18C and FIG. 19 are flowcharts illustrating processing for calculating brightness EVface of a face-image portion according to further embodiments of the present invention. These embodiments calculate the brightness of a face image in a case where a plurality of face images have been detected.

Figure 18A:
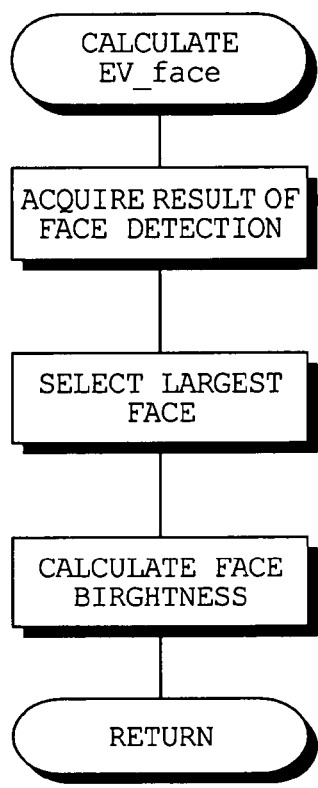
FIGS. 18A to 18C are flowcharts illustrating processing for calculating brightness of a face-image portion.

With reference to FIG. 18A, the result of detection in face-image detection processing is acquired (step 121). If a plurality of face-image portions are detected, the face-image portion among the detected face-image portions that is the largest is selected (it is also permissible to make the selection based upon brightness, inclination or orientation, etc.) (step 122). The brightness EVface of the face-image portion is calculated in the manner set forth above using the face-image portion selected (step 123).

Figure 18B:
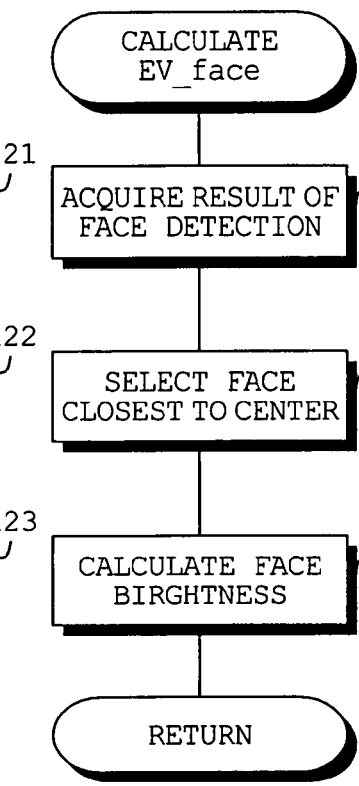

With reference to FIG. 18B, the result of detection in face-image detection processing is acquired (step 124). If a plurality of face-image portions are detected, the face-image portion among the detected face-image portions that is the closest to the center of the image of the subject is selected (step 125). The brightness EVface of the face-image portion is calculated in the manner set forth above using the face-image portion selected (step 126).

Figure 18C:
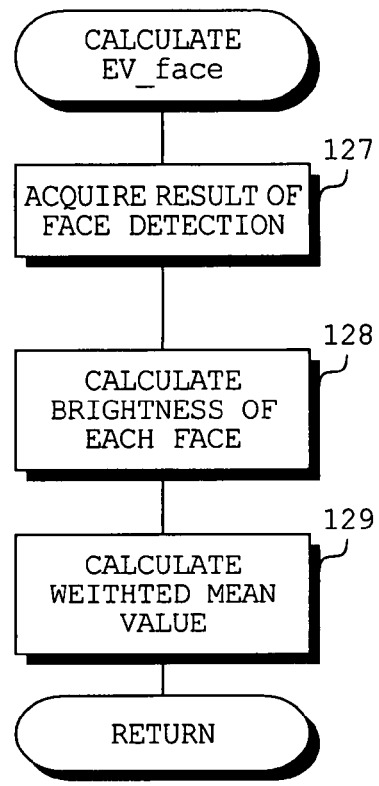

With reference to FIG. 18C, the result of detection in face-image detection processing is acquired (step 127). If a plurality of face-image portions are detected, the brightnesses of the detected plurality of face-image portions are calculated (step 128). Weighted averaging of the calculated brightnesses of the plurality of face-image portions is performed in accordance with Equation (6) below (step 129). The calculated value is the brightness of the face-image portion.

$$EV_{face} = \log_2 \left[ \frac{\sum_{i=0}^{m-1} \left( size_{face[i]} \cdot 2^{EV_{area\_face[i]}} \right)}{\sum_{i=0}^{m-1} size_{face[i]}} \right] \quad \text{Equation (6)}$$

where m represents the number of detected faces.

Equation (6) reflects the values of weighting coefficients in the size of the face-image portion. However, by changing sizeface[i] to scoreface[i], the degree to which the face-image portion is face-like is reflected in the values of the weighting coefficients. Similarly, this can be reflected in the values of the weighting coefficients based upon the position, size, inclination and orientation of the face-image portion.

Figure 19:
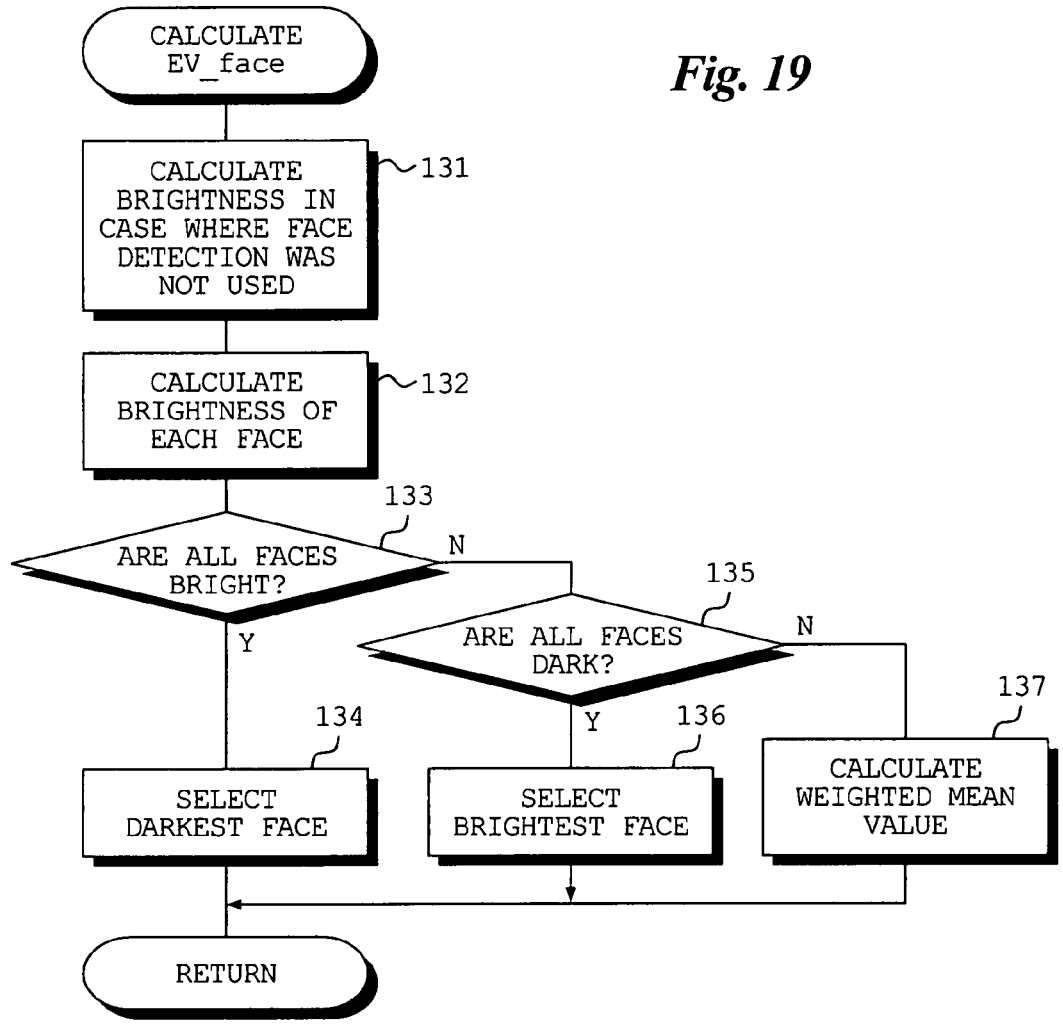
FIG. 19 is a flowchart illustrating processing for calculating brightness of a face-image portion.

With reference to FIG. 19, the brightness of the overall image of a subject in a case where face-image portions have not been utilized is calculated (step 131). The result of detection in face-image detection processing is acquired and the brightnesses of the detected plurality of face-image portions are calculated (step 132).

In a case where all of the calculated brightnesses of the face-image portions are brighter than the brightness of the overall image of the subject ("YES" at step 133), as mentioned above, the darkest face-image portion is selected (step 134). Since the brightness of the selected face-image portion is close to the brightness of the overall image of the subject, the image of the subject obtained will not appear odd even if exposure control is carried out utilizing the face-image portion selected.

If even at least one of the calculated brightnesses of the face-image portions is darker than the brightness of the overall image of the subject ("NO" at step 133), it is determined whether all of the calculated brightnesses of the face-image portions are darker than the brightness of the overall image of the subject (step 135). If all are darker ("YES" at step 135), the brightest face-image portion, which is the face-image portion whose brightness is nearest to the brightness of the overall image of the subject, is selected (step 136). If even one face-image portion brighter than the brightness of the overall image of the subject exists, then the brightness EVface of the face-image portion is calculated in accordance with weighted averaging (step 137).

Figure 20:
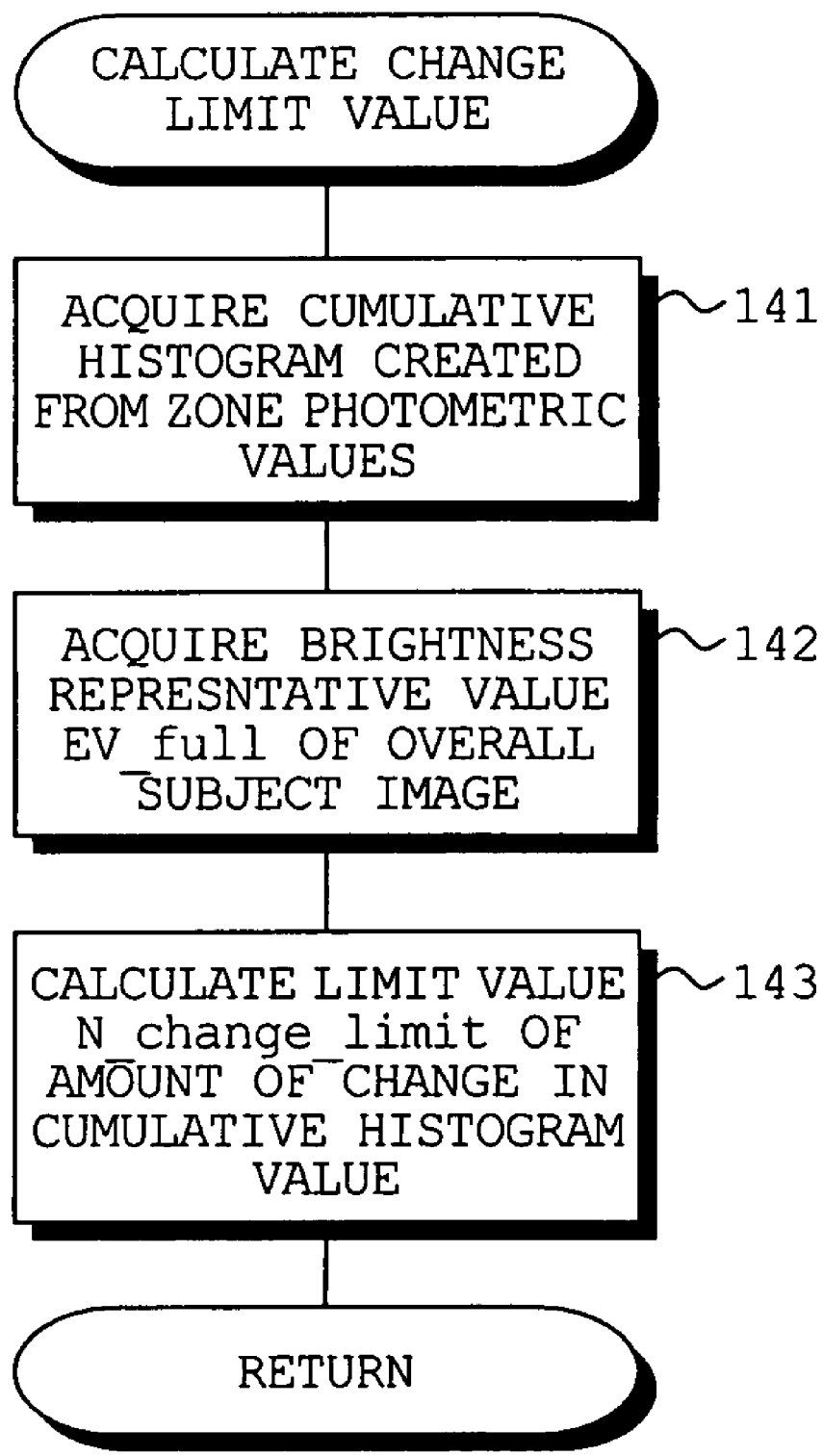
FIG. 20 is a flowchart illustrating processing for calculating a change-limit value.
Figure 21:
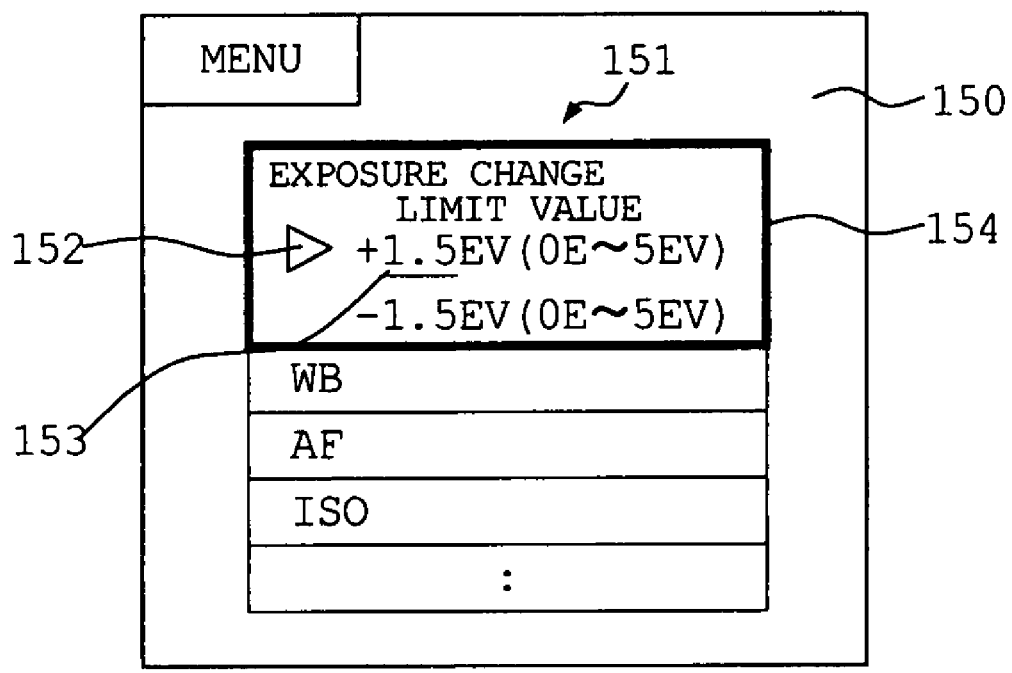
FIG. 21 illustrates an example of the display screen of a digital still camera.

FIGS. 20 and 21 illustrate another embodiment of the invention.

FIG. 20 is a flowchart illustrating processing for calculating the above-mentioned (see FIG. 16) change limit value Nchangelimit.

A cumulative histogram that has been created from zone photometric values is acquired (step 141) and the brightness representative value EVfull of the overall image of the subject is acquired (step 142). The limit value Nchangelimit of the cumulative histogram is calculated utilizing advance learning based upon the obtained cumulative histogram and brightness representative value EVfull (step 143). It will be understood that the threshold value thEV shown in FIG. 14 can also be calculated in a similar manner.

FIG. 21 illustrates an example of a display screen provided on the back of a digital still camera.

The menu screen depicted in FIG. 21 is displayed on a display screen 150 by pressing a menu button provided on the digital still camera.

The menu 151 includes items such as an exposure-change limit value settable by the user, WB (a white balance setting), AF (an automatic focus setting) and ISO (a sensitivity setting). A cursor 154 enclosing any item is displayed in such a manner that it is possible to move between items. The cursor 154 is moved between items in response to depression of the up arrow or down arrow formed on the cross-hair button provided on the digital still camera.

As shown in FIG. 21, the item that is the exposure-change limit value is enclosed by the cursor 154 and therefore the exposure-change limit value is capable of being set. The presently set values (+1.5 EV, −1.5 EV) are being displayed in the item that is the exposure-change limit value. An underline 153 is drawn below one set value +1.5 EV of the present set values and therefore this setting can be changed. The setting can be changed by increasing or decreasing the set value in response to depression of the left arrow or right arrow on the cross-hair button. The value that has been set is written to the EEPROM. Thus, the setting can be changed by the user. It goes without saying that the change limit value of the cumulative histogram can also be changed by the user. Other settings that can be made are "FIX AT SHIPPING TIME", "USER DESIGNATION" and "AUTOMATIC SETTING", etc.

Figure 22:
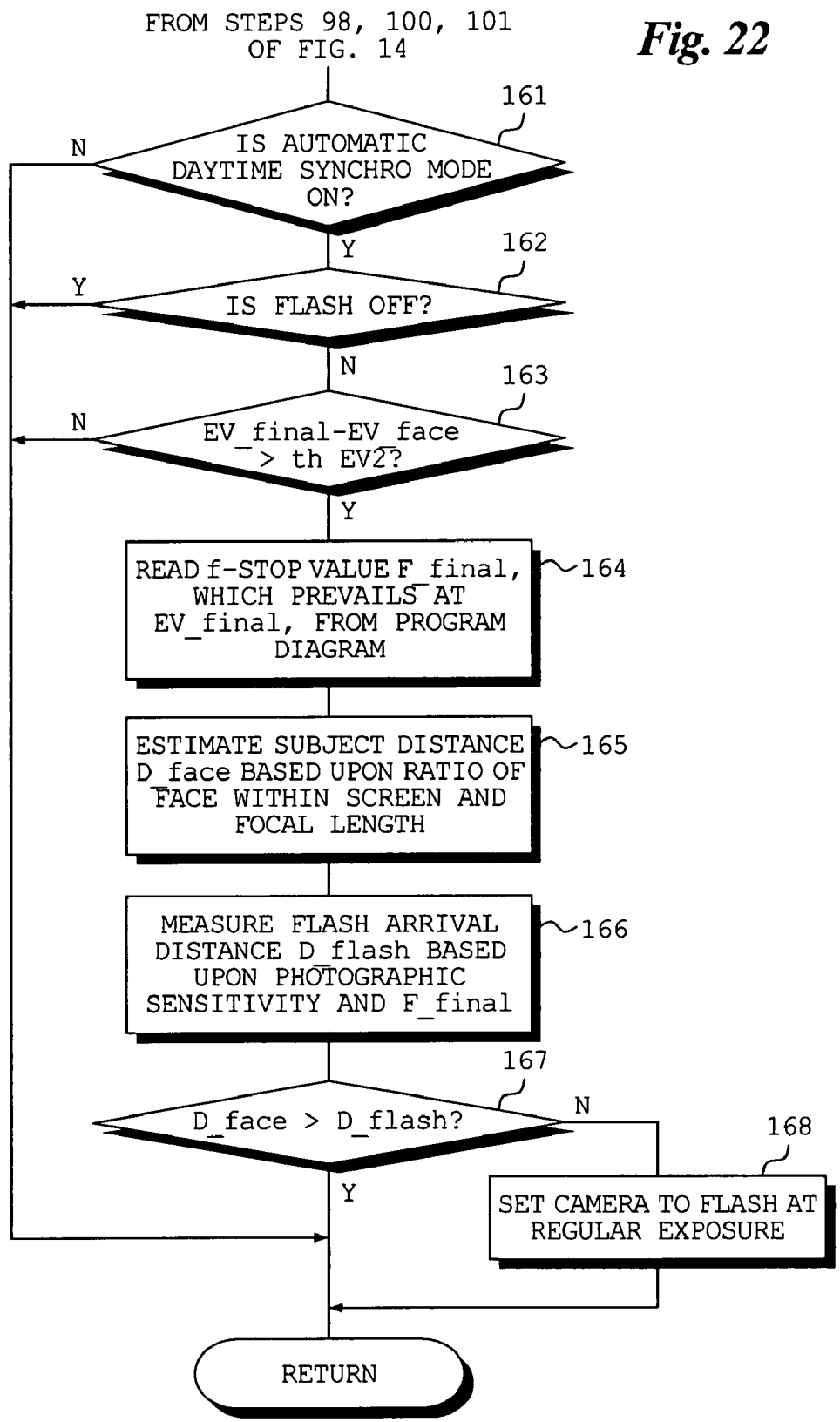
FIGS. 22 and 23 are flowcharts illustrating part of face-detection AE processing.
Figure 23:
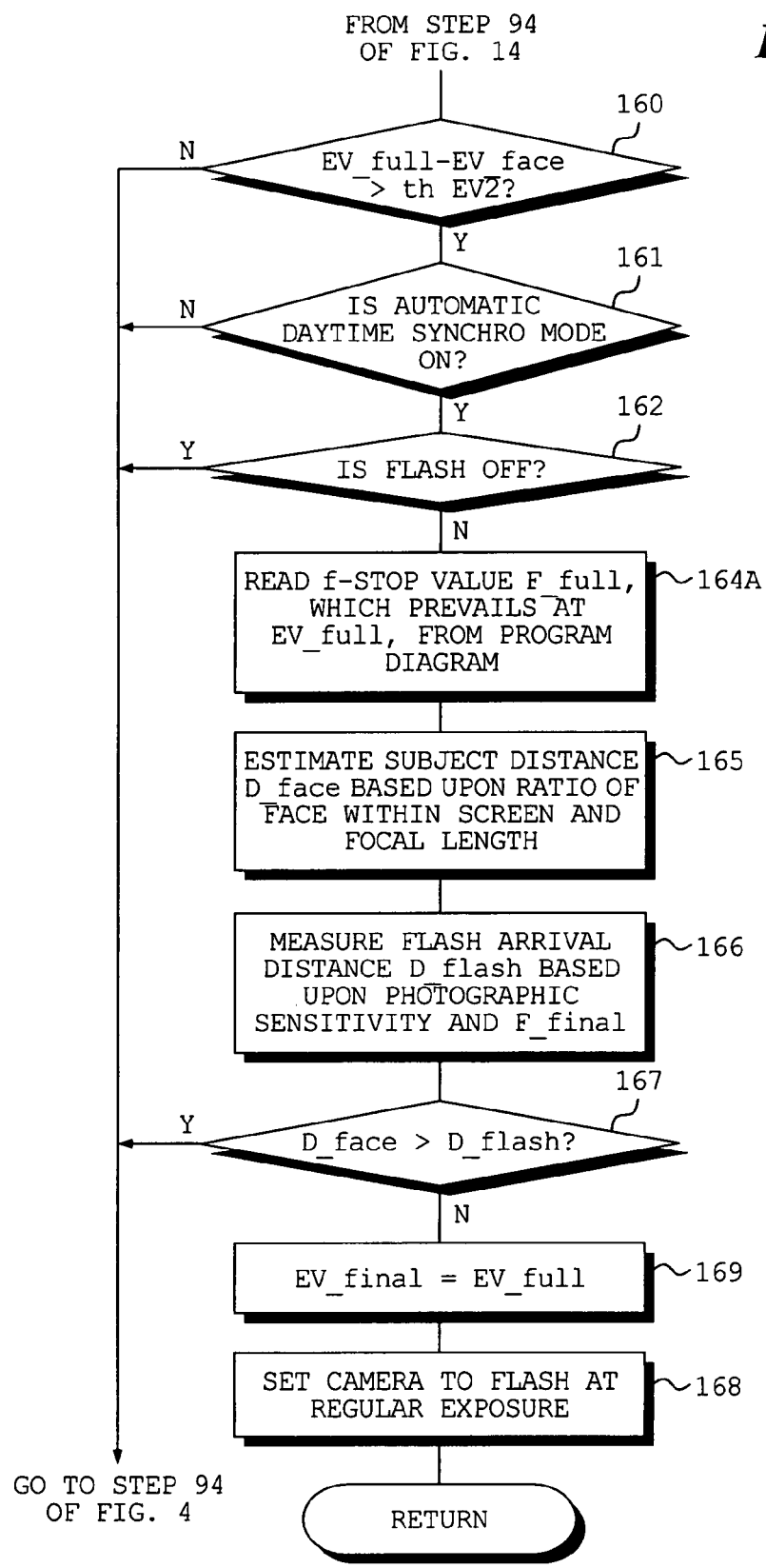

FIGS. 22 and 23 are flowcharts illustrating part of processing for face detection.

When the processing of step 98, 100 or 101 in FIG. 14 ends, control shifts to the processing shown in FIG. 22. This processing controls the firing of the flash by the flash unit 24.

If an automatic daytime synchro shooting mode has been set ("YES" at step 161) and flash photography has not been turned off ("NO" at step 162), it is determined whether the difference between brightness Evfinal calculated as described above and brightness Evface of the face portion is greater than a prescribed threshold value thEV2 (step 163). If the difference is greater than the prescribed threshold value thEV2 ("YES" at step 163), it is construed that the brightness Evface of the face portion is too dark in comparison with the finally calculated brightness Evfinal. Accordingly, the electronic flash is fired, as described below, and brightness of the face approaches the calculated brightness. The face portion is brightened and bleaching out of the background is prevented.

The setting of the automatic daytime synchro shooting mode may be accomplished by setting a fixed value in the digital still camera, or it may be so arranged that this can be set by the user using the operating unit 1, etc. Further, whether flash photography is turned on or off can be set by the user using the operating unit 1, etc.

First, an f-stop value Ffinal prevailing when brightness Evfinal has been calculated is read from a program diagram (step 164). Next, distance Dface to the subject is calculated from the ratio of the face within the screen and the focal length (step 165). It goes without saying that if the digital still camera has been provided with a distance-measuring sensor, then the distance to the subject can be measured using this sensor. Next, flash arrival distance Dflash of the flash emission from the flash unit 24 is calculated from photographic sensitivity and the f-stop value Ffinal calculated (step 166).

It is determined whether the distance Dface to the subject thus obtained is greater than the flash arrival distance Dflash (step 167). If the distance Dface to the subject is equal to or less than the flash arrival distance Dflash ("NO" at step 167), then the flash of light will reach the subject. Hence the digital still camera is set so that the flash will be fired at the time of regular exposure (step 168). Conversely, if the distance Dface to the subject is greater than the flash arrival distance Dflash, then the flash of light will not reach the subject even if the flash is fired. This means that the flash will not be fired at the time of regular exposure. Thus consumption of power can be suppressed by preventing an unnecessary flash of light.

The processing illustrated in FIG. 22 is executed after the final brightness Evfinal has been calculated in FIG. 14. The processing illustrated in FIG. 23, however, is executed during the course of the brightness calculation processing shown in FIG. 14.

Control shifts to the processing of FIG. 23 when, as described above in connection with FIG. 14, the setting of the AE area is performed (step 91), the coordinate transformation to the AE image is performed (step 92), face brightness is calculated (step 93) and the brightness representative value Evfull of the overall image of the subject is calculated (step 94). Processing steps in FIG. 23 identical with those shown in FIG. 22 are designated by like step numbers and need not be described again.

Unlike the case described above, the final brightness Evfinal has not been calculated. It is determined, therefore, whether a value obtained by subtracting face brightness Evface from brightness Evfull of the overall image of the subject is greater than the second threshold value thEV2 (step 160). If the value obtained by subtracting face brightness Evface from brightness Evfull of the overall image of the subject is greater than the second threshold value thEV2 ("YES" at step 163), then it is construed that the face is dark in comparison with the overall image of the subject. Consequently, the electronic flash is fired in a prescribed case in the manner described below.

First, it is determined whether the automatic daytime synchro mode is not off (step 161) and whether the flash mode is on (step 162).

If the automatic daytime synchro mode is on ("YES" at step 161) and the flash mode is not off ("NO" at step 162), then, when the subject is within the flash arrival distance Dface of the flash of light from the flash unit 24 (Dface>Dflash), an f-stop value Ffull prevailing at the time of brightness Evfull of the overall image of the subject is read from a program diagram (step 164A) and the camera is set to fire the flash at the time of regular exposure (steps 165 to 168). The final brightness Evfinal in this case is set to the brightness Evfull of the overall image of the subject (step 169).

If the value obtained by subtracting the face brightness Evface from the brightness Evfull of the overall image of the subject is equal to or less than the second threshold value thEV2 ("NO" at step 163), then there is not much difference between the brightness Evfull of the overall image of the subject and the face brightness Evface. Consequently, operation is performed as described above without firing electronic flash (steps 95 to 101) and the brightness Evfinal is finally obtained. Regular exposure is carried out based upon the brightness Evfinal calculated. If the automatic daytime synchro mode is off ("NO" at step 161) or the flash is off ("YES" at step 162) or the subject is farther away than the flash arrival distance ("YES" at step 167), then the electronic flash is not fired.

Figure 24:
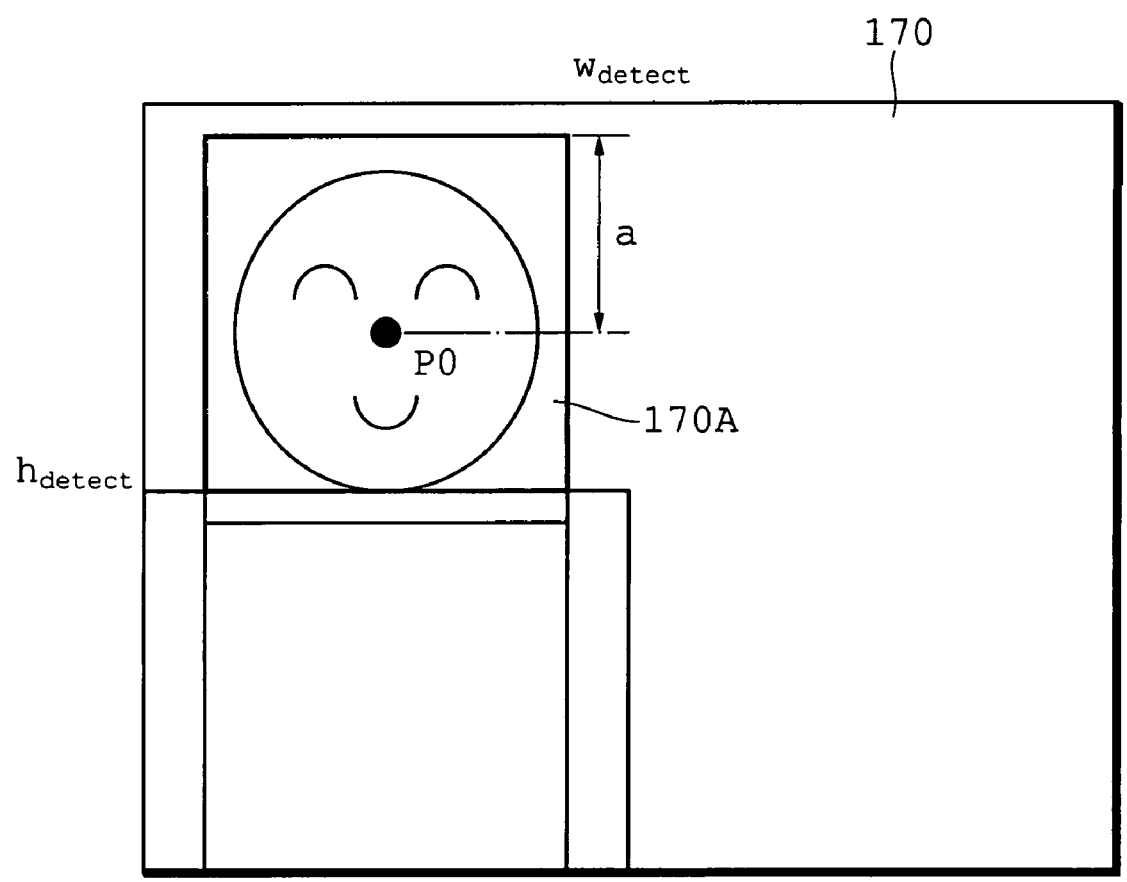
FIG. 24 illustrates an example of a face standardized image.
Figure 25:
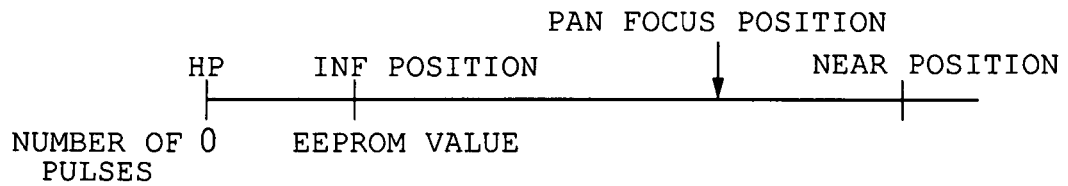
FIG. 25 illustrates the relationship between the focusing-lens position of a zoom lens and number of pulses.
Figure 26:
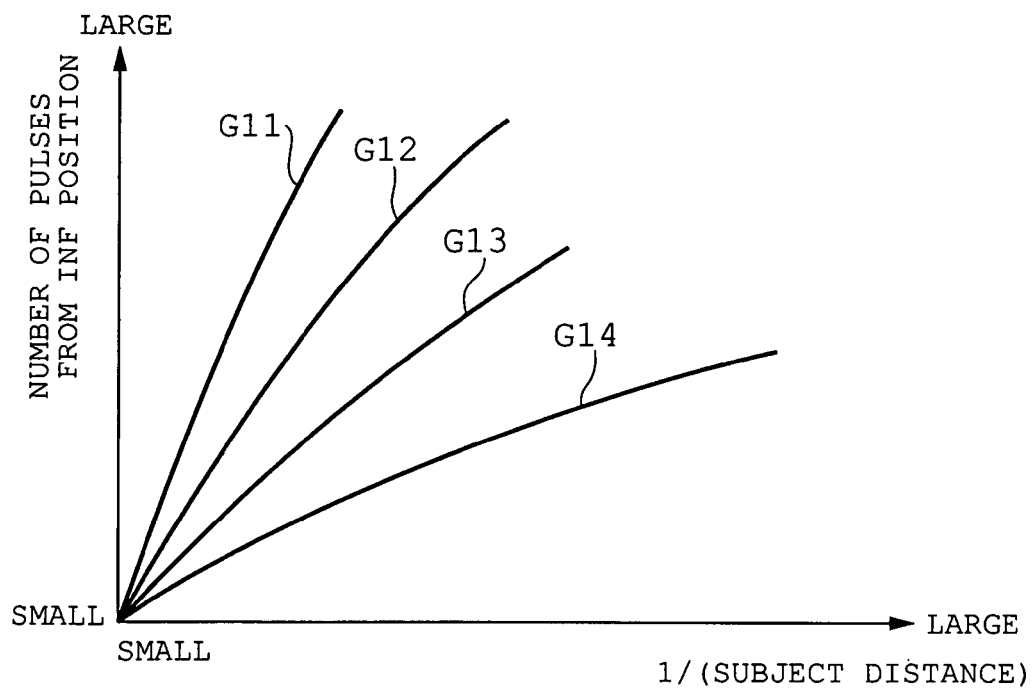
FIG. 26 illustrates relationships between the reciprocal of subject distance and number of pulses from an INF position.

FIGS. 24 to 26 are for describing the calculation of distance to a subject.

FIG. 24 illustrates an example of a face-detection standardized image.

Let Wdetect represent the width of a face-detection standardized image 170, hdetect the height of the image 170, a the length of half of one side of an AE area 170A that has been set in the image 170, and PO the center of the AE area 170A. In this case the subject screen ratio pa is calculated from Equation (7) below.

$$pa = (\text{length of one side of } AE \text{ area})/(\text{height of image})$$
$$= 2a/h\text{detect} \qquad \text{Equation (7)}$$

The AE area (the area indicating the image) does not necessarily indicate the accurate size of the face. In order to approach the accurate size of the face, therefore, the subject screen ratio pa is adjusted as indicated by Equation (8) below using an adjustment coefficient kp.

$$pb = kp \times pa \qquad \text{Equation (8)}$$

where pb represents the adjusted subject screen ratio pa.

In order to calculate the subject distance, it is necessary to calculate the subject screen ratio in terms of a value of focal length obtained in advance by experimentation. In a case where the subject distance is held fixed and the zoom ratio changed, the relation "focal length" ratio="subject screen ratio" ratio will hold. Accordingly, a standard magnification conversion value pc of subject screen ratio for making a conversion to a value of focal length is found from Equation (9) below, where Ztest represents focal length at the time of the advance test and Z the focal length prevailing when the subject of interest is imaged. Calculation at the zoom position is possible.

$$pc = pb \times Ztest/Z0 \qquad \text{Equation (9)}$$

In a case where the zoom ratio is held fixed and the subject distance is changed, the following relation: "subject distance" ratio=reciprocal of "subject screen ration" ratio="reciprocal of subject screen ratio" ratio will hold. Accordingly, the reciprocal of subject distance ILcalc is calculated from Equation (10) below.

$$ILcalc = pc \times kiIcalc \qquad \text{Equation (10)}$$

where kiIcalc is a distance-reciprocal conversion coefficient.

In view of Equation (10), subject distance Lcalc is represented by Equation (11) below.

$$Lcalc = 1/ILcalc \qquad \text{Equation (11)}$$

FIG. 25 illustrates the relationship between number of pulses and pan focus position of the focusing lens in a zoom lens.

The focusing lens has a stipulated position referred to as the home position HP. Traveling distance of the focusing lens is decided in accordance with the number of pulses from a state in which the focusing lens is situated at the home position. An INF position is the position of the focusing lens at which a subject at the longest distance can be brought into focus. The number of pulses up to the INF position has been set in the EEPROM taking into account the zoom ratio and an adjustment value. A NEAR position is the position of the focusing lens at which a subject at the shortest distance can be brought into focus. A pan focus position at which the focusing lens is positioned is the result of adding the number of pulses needed to move the lens from the INF position to the pan focus position to the number of pulses needed to move the lens from the home position HP to the INF position. The number of pulses needed to move the lens from the INF position to the pan focus position can be calculated by an approximation equation or by using data that has been stored beforehand in a LUT (look-up table).

FIG. 26 is a graph illustrating relationships between the reciprocal of distance to the subject and number of pulses needed to moving the focusing lens from the INF position to the pan focus position. Since these relationships differ depending upon the zoom ratio, curves G11 to G14 indicating relationships for every zoom ratio are illustrated. It will be understood that by calculating the reciprocal of subject distance as described above using the curves G11 to G14, the number of pulses can be calculated and the focusing lens can be positioned at the pan focus position.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
   a solid-state electronic image sensing device for sensing the image of a subject and outputting image data representing the image of the subject;
   an exposure control device for adjusting amount of exposure of said solid-state electronic image sensing device;
   a target image detecting device for detecting a prescribed target-image portion from within the image of the subject represented by the image data that is output from said solid-state electronic image sensing device;
   an AE target area deciding device for deciding an AE target area, which is for obtaining the brightness of the target-image portion, based upon the target-image portion detected by said target image detecting device;
   an exposure-amount deciding device for deciding amount of exposure of said solid-state electronic image sensing device based upon image data representing an image within the AE target area decided by said AE target area deciding device; and
   a control device for controlling said exposure control device so as to obtain the amount of exposure decided by said exposure-amount deciding device, wherein
   said AE target area deciding device decides the AE target area in such a manner that the AE target area falls within the target-image portion.

2. The apparatus according to claim 1, wherein said AE target area deciding device decides the AE target area based upon at least one of inclination and orientation of the target-image portion.

3. The apparatus according to claim 1, wherein the AE target area decided by said AE target area deciding device can take on a scope that is predetermined based upon the target-image portion.

4. The apparatus according to claim 1, wherein if the image of the subject contains a plurality of target-image portions, then the AE target area is decided based upon a target-image portion that has a high priority.

5. The apparatus according to claim 4, wherein the priority depends upon at least one among size of the target image portion, degree to which an image portion has the qualities of a target-image portion, and position, brightness, inclination and orientation of the target-image portion.

6. The apparatus according to claim 4, wherein in a case where the brightnesses of a plurality of target-image portions are equal to or greater than a representative value indicating the brightness of the image of the subject, priority rises in order of increasing darkness of the target-image portions; and in a case where the brightnesses of the plurality of target-image portions are less than the representative value indicating the brightness of the image of the subject, priority rises in order of increasing brightness of the target-image portions.

7. The apparatus according to claim 1, wherein if the image of the subject contains a plurality of target-image portions, the amount of exposure is decided based upon a weighted mean of the brightnesses of the plurality of target-image portions.

8. The apparatus according to claim 7, wherein the weighted mean is calculated upon deciding weighting coefficients using at least one among size of the target image portion, degree to which an image portion has the qualities of a target-image portion, and position, brightness, inclination and orientation of the target-image portion.

9. The apparatus according to claim 1, further comprising a flash light-emission device for emitting a flash of light if the amount of exposure obtained based upon the amount of exposure decided by said exposure-amount deciding device is less than a predetermined value.

10. The apparatus according to claim 9, further comprising a distance calculating device for calculating distance to a subject;
wherein said flash light-emission device emits a flash of light if flash arrival distance is equal to or greater than the distance calculated by said distance calculating device.

11. The apparatus according to claim 10, wherein an imaging lens for forming the image of a subject is provided in front of said solid-state electronic image sensing device; and
said distance calculating device calculates the distance from information concerning the target-image portion and information concerning focal length of said imaging lens.

12. The apparatus according to claim 10, wherein said distance calculating device calculates the distance to the subject based upon information obtained from a distance sensor.

13. The apparatus according to claim 1, further comprising an area converting device for converting the AE target area, which has been decided by said AE target area deciding device, to an area on an AE image having a size different from size of the image of the subject and corresponding to the image of the subject;
wherein said exposure-amount deciding device decides the amount of exposure of said solid-state electronic image sensing device based upon image data representing an image within the area obtained by the conversion performed by said area converting device.

14. An image sensing apparatus comprising:
a solid-state electronic image sensing device for sensing the image of a subject and outputting image data representing the image of the subject;
an exposure-amount calculating device for calculating amount of exposure based upon the image of the subject and a prescribed target-image portion contained in the image of the subject represented by the image data that has been output from said solid-state electronic image sensing device; and
an exposure control device for adjusting amount of exposure of said solid-state electronic image sensing device so as to obtain the amount of exposure calculated by said exposure-amount calculating device, wherein
said exposure-amount calculating device calculates the amount of exposure in such a manner that the difference between brightness of the target image and brightness of the image of the subject will fall within a prescribed range.

15. The apparatus according to claim 14, wherein said exposure-amount calculating device calculates the amount of exposure based upon the image of the subject and at least one among position, size, number and brightness of the target-image portion and degree to which an image portion has the qualities of a target-image portion.

16. The apparatus according to claim 14, wherein said exposure-amount calculating device calculates the amount of exposure based upon the target-image portion and at least one among a brightness representative value representing a feature of the overall image of the subject, a zone photometric value obtained by zone metering of the overall image of the subject, a histogram of the overall image of the subject, a maximum value, or a value in the vicinity thereof, of a zone photometric value of the image of the subject, and a minimum value, or a value in the vicinity thereof, of a zone photometric value of the image of the subject.

17. The apparatus according to claim 14, wherein if the image of the subject has been divided into a plurality of areas, said exposure-amount calculating device calculates the amount of exposure based upon the image of the subject and images in all divided areas that include the target-image portion or an image in a divided area contained in the target-image portion.

18. The apparatus according to claim 14, wherein the prescribed range may be a fixed range, a range designated by the user or a range that varies depending upon the scene.

19. The apparatus according to claim 14, further comprising an indicator that indicates a ratio with respect to a brightness distribution of the overall image of the subject, said exposure-amount calculating device calculating an amount of exposure in such a manner that the difference between a first value corresponding to a representative value of brightness of the image of the subject and a second value corresponding to brightness obtained from the amount of exposure calculated based upon the target-image portion and image of the subject will fall within a prescribed range, wherein said first value and said second value are derived based on said ratio.

20. The apparatus according to claim 14, wherein if the image of the subject contains a plurality of target-image portions, said exposure-amount calculating device calculates the amount of exposure based upon a target-image portion that has a high priority.

21. The apparatus according to claim 20, wherein the priority depends upon at least one among size of the target image portion, degree to which an image portion has the qualities of a target-image portion, and position, brightness, inclination and orientation of the target-image portion.

22. The apparatus according to claim 20, wherein in a case where the brightnesses of a plurality of target-image portions are equal to or greater than a representative value indicating the brightness of the image of the subject, priority rises in order of increasing darkness of the target-image portions; and in a case where the brightnesses of the plurality of target-image portions are less than the representative value indicating the brightness of the image of the subject, priority rises in order of increasing brightness of the target-image portions.

23. The apparatus according to claim 14, wherein if the image of the subject contains a plurality of target-image portions, said exposure-amount calculating device calculates the amount of exposure based upon a weighted mean of the brightnesses of the plurality of target-image portions.

24. The apparatus according to claim 23, wherein the weighted mean is calculated upon deciding weighting coefficients using at least one among size of the target image portion, degree to which an image portion has the qualities of a target-image portion, and position, brightness, inclination and orientation of the target-image portion.

25. The apparatus according to claim 14, further comprising a flash light-emission device for emitting a flash of light if the amount of exposure that has been adjusted by said exposure control device is less than a predetermined value.

26. The apparatus according to claim 14, further comprising a flash light-emission device for emitting a flash of light if the difference between brightness of the target-image portion and brightness of the image of the subject is outside a first prescribed range.

27. The apparatus according to claim 14, further comprising a flash light-emission device for emitting a flash of light if the difference between brightness of the target-image portion and brightness indicated by the amount of exposure that has been calculated by said exposure-amount calculating device is outside a second prescribed range.

28. An image sensing apparatus comprising:
a solid-state electronic image sensing device for sensing the image of a subject and outputting image data representing the image of the subject;
a weighting-coefficient deciding device for deciding a weighting coefficient in each portion of the image of the subject in such a manner that the closer a portion is to a target-image portion contained in the image of the subject represented by the image data that is output from said solid-state electronic image sensing device, the larger weighting becomes;
a calculating device for calculating brightness of the target-image portion using the weighting coefficients decided by said weighting-coefficient deciding device and brightness of each portion of the image of the subject; and
an exposure-amount control device for controlling amount of exposure of said solid-state electronic image sensing device based upon the brightness calculated by said calculating device.

29. The apparatus according to claim 28, wherein said exposure-amount control device calculates the amount of exposure based upon the target-image portion and, in a case where the image of the subject has been divided into a plurality of areas, photometric values of respective ones of the areas obtained by division or a representative value of brightness of the image of the subject obtained based upon the photometric values.

30. The apparatus according to claim 28, further comprising:
a target image detecting device for detecting a prescribed target-image portion from within the image of the subject represented by the image data that is output from said solid-state electronic image sensing device; and
a dividing device for dividing the image of the subject into a plurality of areas so as to become the area becoming large as separated from the target-image portion detected by said target image detecting device, wherein
said weighting-coefficient deciding device decides the weighting-coefficient of the area divided by said dividing device so as to become the weighting-coefficient becoming if the area is near the target-image portion detected by said target image detecting device.

31. A method of controlling an image sensing apparatus having a solid-state electronic image sensing device for sensing the image of a subject and outputting image data representing the image of the subject, and an exposure control device for adjusting amount of exposure of the solid-state electronic image sensing device, said method comprising the steps of:
detecting a prescribed target-image portion from within the image of the subject represented by the image data that is output from the solid-state electronic image sensing device;
deciding an AE target area, which is for obtaining the brightness of the target-image portion, based upon the target-image portion detected;
deciding amount of exposure of the solid-state electronic image sensing device based upon image data representing an image within the AE target area decided; and
controlling the exposure control device so as to obtain the amount of exposure decided, wherein
said AE target area is decided in such a manner that the AE target area falls within the target-image portion.

32. A method of controlling an image sensing apparatus, comprising the steps of:
sensing the image of a subject using a solid-state electronic image sensing device and obtaining image data representing the image of the subject;
calculating amount of exposure based upon the image of the subject and a prescribed target-image portion contained in the image of the subject represented by the image data that has been output from the solid-state electronic image sensing device; and
adjusting amount of exposure of the solid-state electronic image sensing device so as to obtain the amount of exposure calculated, wherein
said amount of exposure is calculated in such a manner that the difference between brightness of the target image and brightness of the image of the subject will fall within a prescribed range.

33. A method of controlling an image sensing apparatus, comprising the steps of:
sensing the image of a subject using a solid-state electronic image sensing device and obtaining image data representing the image of the subject;
deciding a weighting coefficient in each portion of the image of the subject in such a manner that the closer a portion is to a target-image portion contained in the image of the subject represented by the image data that is output from the solid-state electronic image sensing device, the larger weighting becomes;
calculating brightness of the target-image portion using the weighting coefficients decided and brightness of each portion of the image of the subject; and
controlling amount of exposure of the solid-state electronic image sensing device based upon the brightness calculated.

* * * * *